(12) United States Patent
Loviken et al.

(10) Patent No.: US 12,378,869 B2
(45) Date of Patent: Aug. 5, 2025

(54) METHODS FOR PRODUCING A GEOTHERMAL WELL

(71) Applicant: Schlumberger Technology Corporation, Sugar Land, TX (US)

(72) Inventors: Pontus Loviken, Clamart (FR);
Matthieu Simon, Clamart (FR);
Josselin Kherroubi, Clamart (FR);
Andrew J. Parry, Clamart (FR);
Ronan Meneu, Montpellier (FR);
Olivier Bernard, Montpellier (FR);
Delphine Coutrot, Montpellier (FR);
Elodie Daynac, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/613,365

(22) Filed: Mar. 22, 2024

(65) Prior Publication Data

US 2024/0318537 A1    Sep. 26, 2024

(30) Foreign Application Priority Data

Mar. 22, 2023 (EP) .................................. 23305387

(51) Int. Cl.
*E21B 44/00* (2006.01)
*F24T 10/00* (2018.01)

(52) U.S. Cl.
CPC ............ *E21B 44/00* (2013.01); *F24T 10/00* (2018.05); *E21B 2200/20* (2020.05); *F24T 2010/53* (2018.05)

(58) Field of Classification Search
None
See application file for complete search history.

(56) References Cited

U.S. PATENT DOCUMENTS

| | | | |
|---|---|---|---|
| 9,915,247 | B2 | 3/2018 | Stewart |
| 10,394,290 | B2 | 8/2019 | Hardin |
| 11,156,386 | B2 * | 10/2021 | Cairns ..................... F24T 10/13 |
| 11,574,372 | B2 | 2/2023 | Barbour |
| 12,048,115 | B2 | 7/2024 | Cairone, Jr. |
| 12,048,128 | B2 | 7/2024 | Keisling |
| 12,232,295 | B2 | 2/2025 | Weisemann |

(Continued)

FOREIGN PATENT DOCUMENTS

| | | |
|---|---|---|
| CN | 112627797 A | 4/2021 |
| CN | 113294137 A | 8/2021 |

(Continued)

OTHER PUBLICATIONS

Earth Energy Designer (EED) Version 4 Update Manual, Version 4.3, downloaded on Jan. 6, 2025 from the internet [https://buildingphysics.com/EED4.pdg], 72 pages.

(Continued)

*Primary Examiner* — Nicole Coy
*Assistant Examiner* — Douglas S Wood
(74) *Attorney, Agent, or Firm* — Jeffrey D. Frantz

(57) ABSTRACT

A method of producing a geothermal well includes obtaining site information including at least a site volume; obtaining drilling parameters; determining lengths and orientations of planned wellbores based at least partially on the site information and the drilling parameters.

19 Claims, 11 Drawing Sheets

(56) References Cited

U.S. PATENT DOCUMENTS

| | | | | |
|---|---|---|---|---|
| 2010/0288465 | A1* | 11/2010 | Stewart | F03G 7/04 165/45 |
| 2011/0132600 | A1 | 6/2011 | Kaminsky | |
| 2011/0197599 | A1* | 8/2011 | Stewart | F03G 7/04 62/157 |
| 2012/0090807 | A1* | 4/2012 | Stewart | F03G 7/04 165/45 |
| 2014/0368991 | A1 | 12/2014 | James | |
| 2015/0218928 | A1 | 8/2015 | Suvanen | |
| 2019/0128068 | A1* | 5/2019 | Danko | E21B 47/022 |
| 2020/0045857 | A1 | 2/2020 | Magcale | |
| 2020/0190937 | A1* | 6/2020 | Nevison | E21B 43/267 |
| 2020/0191444 | A1* | 6/2020 | Nevison | F24T 50/00 |
| 2021/0406833 | A1* | 12/2021 | Chen | G06Q 50/08 |
| 2022/0400577 | A1 | 12/2022 | Smith | |
| 2023/0124192 | A1 | 4/2023 | Liedtke | |
| 2023/0358120 | A1* | 11/2023 | Lau | E21B 41/0064 |
| 2024/0085065 | A1* | 3/2024 | Crossley | F24T 10/20 |
| 2024/0334644 | A1 | 10/2024 | Cairone, Jr. | |
| 2025/0066927 | A1 | 2/2025 | Conner | |
| 2025/0071953 | A1 | 2/2025 | Chehade | |

FOREIGN PATENT DOCUMENTS

| | | |
|---|---|---|
| CN | 115493176 A | 12/2022 |
| CN | 116518585 A | 8/2023 |
| CN | 116576494 A | 8/2023 |
| EP | 2811109 A1 | 12/2014 |
| EP | 4489539 A1 | 1/2025 |
| WO | 2016108913 A1 | 7/2016 |
| WO | 2023034878 A1 | 3/2023 |
| WO | 2023185961 A1 | 10/2023 |

OTHER PUBLICATIONS

Beck, M. et al., Geometric arrangement and operation mode adjustment in low-enthalpy geothermal borehole fields for heating, Energy, vol. 49, 2013, pp. 434-443.

Edelman, L., "Facebooks hyperscale date center warms Odense", downloaded from the Internet on Jan. 6, 2025 from [https://tech.facebook.com/engineering/2020/7/odense-data-center-2/], 2020, 6 pages.

Eskilsen, P., "Thermal Analysis of Heat Extraction Boreholes", Doctoral thesis. Department of Mathematical Physics, University of Lund, Lund, Sweden, 1987, 222 pages.

"Geothermal Energy", Chapter 29 in ASHRAE Handbook—Heating, Ventilating, and Air-Conditioning Applications. Atlanta, Georgia, ASHRAE. 1995, 29 pages.

Grundmann, R. M., "Improved Design Methods for Ground Heat Exchangers", MSC thesis, Oklahoma State University, Stillwater, 2016, 174 pages.

Hooke, R. et al., "Direct Search" Solution of Numerical and Statistical Problems, Journal of the ACM, 1961 8(2), pp. 212-229.

MacGregor, K., "Full Steam Ahead: Unearthing the Power of Geotherman", downloaded on Jul. 29, 2024 from [https://www.nrel.gov/news/features/2023/full-steam-ahead-unearthing-the-power-of-geothermal.html] 2023, 11 pages.

Ng, A. et al., "Policy invariance under reward transformations: Theory and application to reward shaping," Proceedings of the Sixteenth International Conference on Machine Learning, 1999, 99, 10 pages.

Product Brochure "Chaudiere Numerique" Neural-IT downloaded on Jul. 29, 2024 from [https://neutral-it.com/chaudiere-numerique/], undated, 12 pages.

Reitsman, Stan, CEO, Geosource Energy Inc., "Commercial Urban Drilling: Challenges and Successes," [Online]. Available: https://igshpa.org/wp-content/uploads/13-Commercial-Urban-Drilling-Stan-Reitsma.pdf. [Accessed Jul. 29, 2024].

International Search Report and Written Opinion of PCT Application No. PCT/US2024/021077, mailed Jul. 22, 2024.

Meibodi,, S. S. et al., "The future role of energy geostructures in fifth generation district heading and cooling networks", Energy, 2021, 240, pp.

\* cited by examiner

METHODS FOR PRODUCING A GEOTHERMAL WELL

CROSS-REFERENCE TO RELATED APPLICATIONS

This application claims priority to and the benefit of European Patent Application No. 23305387.5, filed 22 Mar. 2023, which is hereby incorporated by reference in its entirety.

BACKGROUND

Ground source heat pump systems are conventionally conceived with vertical wells that extend in depth from about 50 to 250 meters. During the design phase, the wells are positioned after estimating the total length required to cover all or a portion of a building thermal needs. To estimate the required length, crude approximations are often used, such as with the American Society of Heating, Refrigerating, and Air-Conditioning Engineers (ASHRAE) method: a simple equation provides the total drilled length of vertical wellbores as a function of the building thermal power needs at different time scales with a temperature penalty term linked to the thermal interactions between the wells and their spacings.

SUMMARY

In some embodiments, a method of producing a geothermal well includes obtaining site information including at least a site volume; obtaining drilling parameters; determining a quantity of planned wellbores having a shared wellhead based at least partially on the site information and drilling parameters; determining orientations of the planned wellbores based at least partially on the site information, the drilling parameters, and the quantity of wellbores to position wellbores within boundaries of the site volume; determining lengths of the planned wellbores based at least partially on the site information, the drilling parameters, and the quantity of wellbores to position wellbores within boundaries of the site volume; and drilling at least a first wellbore of the planned wellbores based on a determined orientation and a determined length from the shared wellhead.

In some embodiments, a method of producing a geothermal well includes obtaining site information including at least a site volume; obtaining drilling parameters; determining a quantity of planned wellbores having a shared wellhead based at least partially on the site information and drilling parameters; determining orientations of the planned wellbores based at least partially on the site information, the drilling parameters, and the quantity of wellbores to position wellbores within boundaries of the site volume; determining lengths of the planned wellbores based at least partially on the site information, the drilling parameters, and the quantity of wellbores to position wellbores within boundaries of the site volume; drilling a first drilled wellbore of the planned wellbores based on a determined orientation and a determined length from the shared wellhead; measuring at least one wellbore property of the first drilled wellbore; recalculating orientations and lengths of remaining planned wellbores based at least partially on the at least one wellbore property of the first drilled wellbore; and drilling at least one drilled remaining wellbore of the remaining planned wellbores.

In some embodiments, a method of producing a geothermal well includes obtaining site information including at least a site volume; obtaining drilling parameters; determining a quantity of planned wellbores having a shared wellhead based at least partially on the site information and drilling parameters; determining orientations of the planned wellbores based at least partially on the site information, the drilling parameters, and the quantity of wellbores to position wellbores within boundaries of the site volume; determining lengths of the planned wellbores based at least partially on the site information, the drilling parameters, and the quantity of wellbores to position wellbores within boundaries of the site volume; drilling a first drilled wellbore of the planned wellbores based on a determined orientation and a determined length from the shared wellhead; measuring at least one wellbore property of the first drilled wellbore; recalculating orientations and lengths of remaining planned wellbores based at least partially on the at least one wellbore property of the first drilled wellbore; and drilling an additional wellbore based at least partially on a measured wellbore property of a previously drilled wellbore.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which:

FIG. 5-1 and FIG. 5-2 are schematic diagrams of a geothermal well in a site volume, according to some embodiments of the present disclosure;

FIG. 6-1 is a schematic diagram of a geothermal well in a site volume with a rectangular shared wellhead, according to some embodiments of the present disclosure;

FIG. 6-2 is a schematic diagram of a geothermal well in a site volume with a plurality of shared wellheads, according to some embodiments of the present disclosure;

DETAILED DESCRIPTION

Embodiments of the present disclosure generally relate to devices, systems, and methods for planning and drilling a geothermal well. More specifically, embodiments of the present disclosure relate to calculating and drilling a geothermal well with an array of wellbores with the most efficient thermal recovery from the formation. Drilling a geothermal well allows the positioning of wellbore heat exchangers (BHEs) in the wellbores of the well. The BHEs transfer heat between a home, office, or other building primarily above ground with the geologic formation underground. Because the geologic formation remains substantially constant in temperature, the BHEs of the geothermal well can heat the building in colder temperatures above ground and cool the building in hotter temperatures above ground. To provide sufficient thermal transfer rates and sufficient thermal capacity through the BHEs to and from the geologic formation, the geothermal well can include a plurality of wellbores and a plurality of BHEs.

Conventional geothermal wells include a plurality of vertical wellbores positioned throughout a field or area that allows each wellbore of the well to exchange heat with a different portion of the geological formation. However, drilling a plurality of wellbores from a plurality of locations requires moving the drilling equipment and managing a plurality of connections and contacts above ground. For example, an array of wellbores can be located across a 100 meter (m) by 100 m field, increasing drilling costs during creation of the geothermal well and maintenance costs over time of the geothermal well.

In some embodiments according to the present disclosure, a method of drilling a geothermal well includes designing and drilling a plurality of non-vertical wellbores from a shared wellhead. In some embodiments, a center wellbore is substantially vertical, at least two of the remaining wellbores of the plurality of wellbores are non-vertical. A method of drilling a geothermal well, in some embodiment, includes obtaining and inputting site information and drilling parameters into a model or system that determines and outputs an array of planned wellbores that distributes the planned wellbores within an available volume of geological formation based on the thermal transfer rates available in the geological formation.

Figure 1:
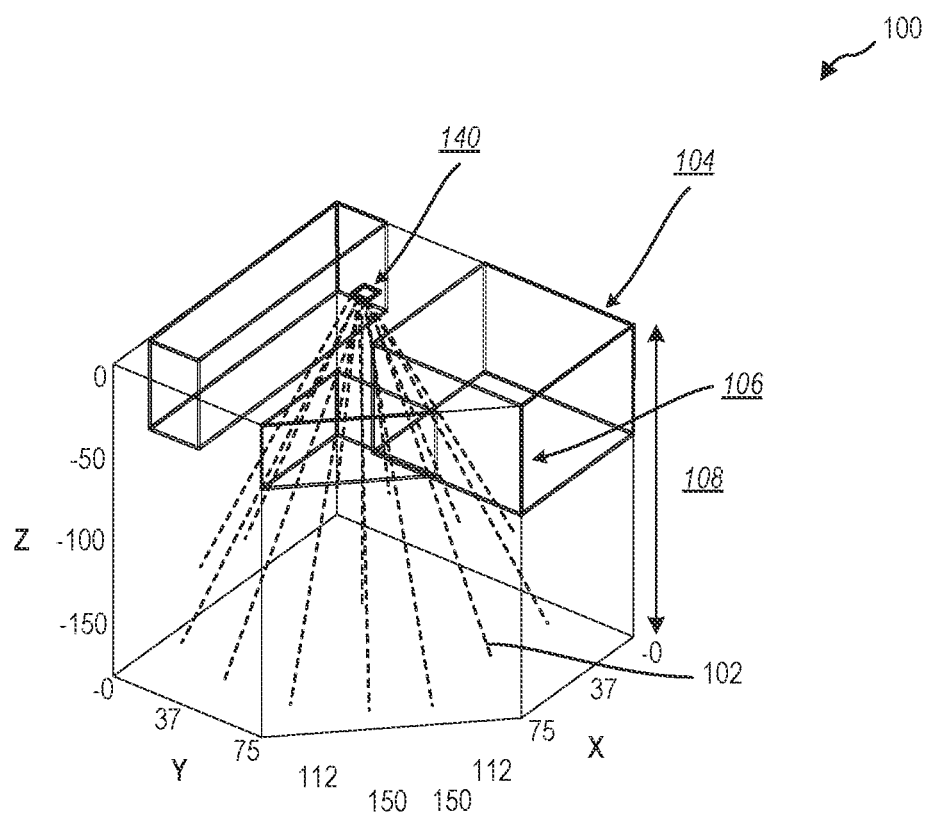
FIG. 1 is a schematic diagram of a geothermal well in a site volume, according to some embodiments of the present disclosure.

FIG. 1 is a perspective view of a planned geothermal well 100 according to some embodiments of the present disclosure. For example, the planned geothermal well 100 includes a plurality of planned wellbores 102 that each have at least an orientation and a length. In some examples, the orientation is relative to the direction of gravity. In some examples, the orientation is relative to a surface orientation, such as when the wellhead is located on a hillside. In the illustrated embodiment, the surface orientation is substantially perpendicular to the direction of gravity, such that the orientation of the wellbore is substantially the same whether considered relative to the surface orientation or the direction of gravity.

In some embodiments, the planned geothermal well 100 is determined based at least partially on a variety of site constraints. The site constraints are determined from site information. The site information includes, but is not limited to, surface property limits 104, no-drill zones 106, maximum allowable depth 108, geothermal profile of the site, and other information. The surface property limits 104 (e.g., property boundary) and the maximum allowable depth 108 define the outer bounds of a site volume in which wellbores 102 may be drilled. In some embodiments, the site volume is further defined by no-drill zones 106, such as building foundations, drainage, storage tanks, wastewater tanks, other underground structures, and any applicable buffer areas around such underground structures. In some embodiments, the site constraints further include a shared wellhead region 140 from which the wellbores 102 of the geothermal well 100 may originate at the surface.

As illustrated in FIG. 1, the site volume provides the volume in which wellbores may be drilled and/or positioned and, based at least partially on a geothermal profile, the thermal capacity available by a given planned geothermal well 100. In some embodiments, the geothermal profile may be assumed to be a constant profile relative to the surface. In some embodiments, the geothermal profile may be assumed to be a constant value throughout the site volume for initial calculations and/or drilling. In some embodiments, the geothermal profile for the site volume is known from prior measurements or records. In some embodiments, the geothermal profile is estimated from similar sites.

In some embodiments, while the site volume allows for wellbores to be positioned at any locations therein, the drilling of the wellbores is limited to an allowed drilling area. For example, the allowed drilling area may be limited for legal reasons, such as property casements that allow access to the site, or for logistical reasons, such as access from a road or due to impassable terrains. In some embodiments, an allowed drilling area on the surface defines a region of the surface from which the wellbores may be drilled. In some non-limiting examples, each of the wellbores may originate from a shared wellhead from which all of the wellbores may be drilled without substantially moving the drilling equipment.

The planned geothermal well 100 may be further determined based at least partially on drilling constraints and/or drilling parameters, such as wellbore properties including a thermal transfer rate, a cost-per-meter for drilling a wellbore in the geological formation, a cost-per-start for each wellbore, a drilling rate, a maximum angle, a minimum wellbore length, a maximum wellbore length, a maximum well length (e.g., total length of the wellbores), minimum distance between wellbores, and other properties of the drilling and costs associated therewith. For example, the expense of initiating drilling a wellbore may have an overhead cost associated therewith before any wellbore is drilled. In at least one example, drilling an additional 10 meters on 10 wellbores may cost less than drilling an 11th wellbore with a length of 100 meters. However, based upon the site information and/or site constraints, drilling an additional 10 meters may not be possible without exceeding a maximum allowable depth.

In some embodiments, the planned geothermal well 100 is determined based at least partially on project constraints, which are high-level constraints on the planned geothermal well 100, such as the required total thermal capacity and a cost limit.

Figure 2:
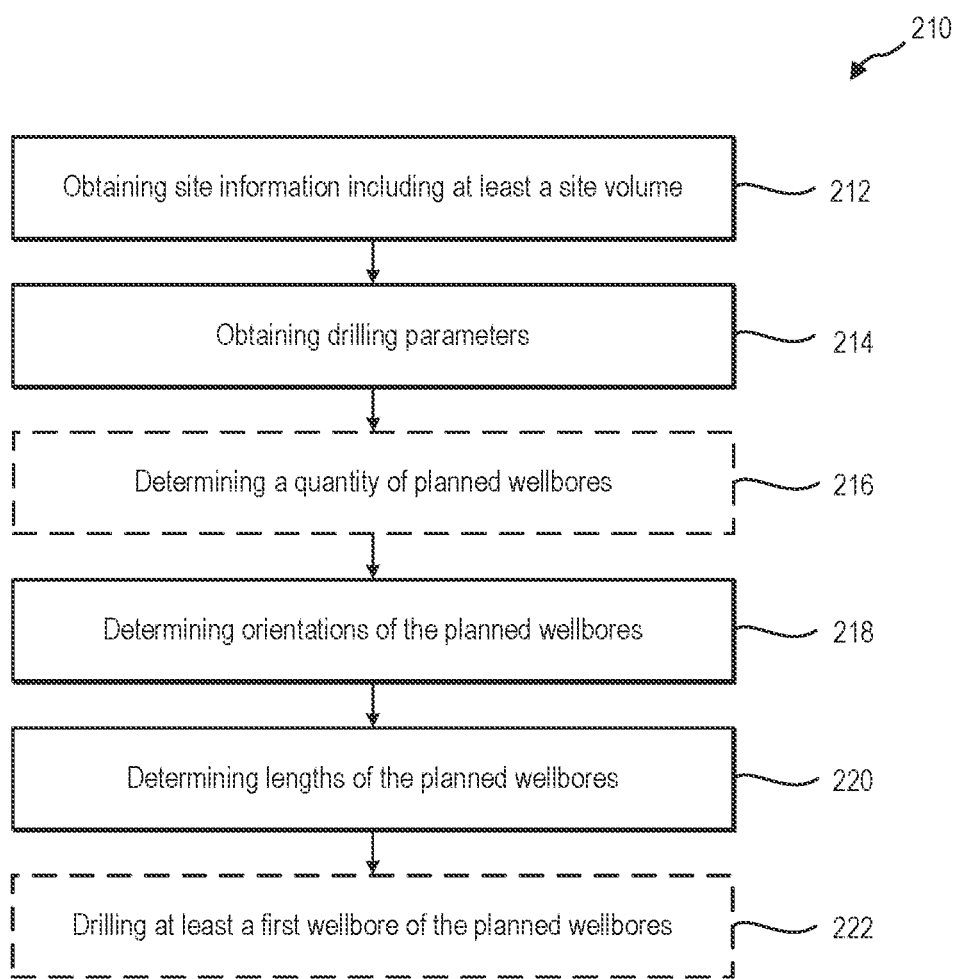
FIG. 2 is a flowchart illustrating a method of producing a geothermal well, according to some embodiments of the present disclosure.

FIG. 2 is a flowchart illustrating an embodiment of a method 210 of drilling a geothermal well. In some embodiments, the method 210 includes obtaining site information including at least a site volume at 212. In some embodiments, obtaining the site information includes accessing the site information from a local hardware storage device. For example, a hardware storage device is any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. In some embodiment, obtaining the site information includes accessing the site information from a remote storage device, such as a cloud storage device or server computer.

The site information includes at least a site volume that is defined by a property limit and a maximum allowable depth. In some embodiments, the site volume further includes no-drill zones that will limit the positioning of planned wellbores within the site volume. In some embodiments, the site information includes a geothermal profile of the site. For example, different properties of the site may affect the geothermal properties, such as groundwater presence, formation composition, and other underground structures such as other pipes and wells. In some embodiments, the site information further includes an allowed drilling area located at the surface of the site volume.

In some embodiments, the method 210 further includes obtaining drilling parameters at 214. The drilling parameter may include wellbore properties including a thermal transfer rate, a cost-per-meter for drilling a wellbore in the geological formation, a cost-per-start for each wellbore, a drilling rate, a maximum angle, a minimum wellbore length, a maximum wellbore length, a maximum well length (e.g., total length of the wellbores), minimum distance between wellbores, and other properties of the drilling and costs associated therewith. The drilling parameters allow a machine learning model or other model to determine the planned geothermal well when considered in context of the site information.

The method 210 may include determining a quantity of planned wellbores at 216 before determining orientations of the planned wellbores at 218 and determining lengths of the planned wellbores at 220. In some embodiments, determining the quantity of planned wellbores includes receiving a predetermined quantity of planned wellbores from an operator. For example, drilling constraints may limit the ability of a drilling team to produce the geothermal well, limiting the quantity of wellbores. In other examples, the quantity of planned wellbores may be selected by an operator based on the cost of BHEs or other materials involved with the construction of the geothermal well and associated HVAC equipment. In such cases, the quantity of planned wellbores may be one of the drilling parameters obtained at 214. In some embodiments, a machine learning model or other model iterates through a plurality of instances and/or nodes to determine the quantity of planned wellbores, as will be described in more detail herein.

Determining the orientations and determining the lengths of the planned wellbores is based at least partially on the site information and the drilling parameters. For example, an orientation and length of the planned wellbore may be based at least partially on a maximum allowable depth of the site volume and/or a maximum angle of the wellbore relative to the surface. In some examples, the orientation and length of the planned wellbore may be based at least partially on the geothermal profile of the site volume, such as the temperature increasing proximate a lower region of the site volume or a presence of groundwater in the site volume limiting a length of the wellbore. Determining the quantity, orientation, and length of the planned wellbores of the geothermal well will be described in more detail herein.

The method 210 further includes drilling at least a first wellbore of the planned wellbores at 222. In some embodiments, the method 210 includes drilling all of the wellbores of the geothermal well. In some embodiments, and as will be described herein, the method 210 includes drilling the first wellbore and using the first wellbore to obtain additional site information and/or drilling parameters to further refine the planned geothermal well and/or the planned wellbore(s). This operation is an optional configuration. In other configurations, the method may output the determined orientation and length, for instance for visualization by a user or as drilling instructions for drilling systems.

In some embodiments, determining the quantity, orientations, and lengths of the planned wellbores of the planned geothermal well includes using a machine learning model or other model with equality constraints and inequality constraints. In some examples, the equality constraints include a total length of wellbores in the well, such as a constant $L^*$. In some examples, the equality constraints include a predetermined or fixed quantity of wellheads, such as 1, 2, 3, 4, 5, or more. In most examples, the quantity of wellheads is a few or less, based on the site information and/or the logistics of accessing the allowable drilling areas.

In some embodiments, the inequality constraints are more flexible and may include a variety of conditions and properties, as long as a starting configuration can be found that satisfies them all. In some examples, the inequality constraints include a maximum angle. For example, the inclination of a wellbore must be smaller than some maximum angle $\theta^*$. In at least one example, an inequality constraint is that each wellbore must be longer than some minimal length $l^*$. In at least one example, an inequality constraint is that all parts of a wellbore or the well must be within the site volume, where the site volume is defined by a maximum depth of $D^*$ (for example, 200 m) and a polygon in the x, y-plane, defining the property limits (e.g., boundary of the property). In at least one example, an inequality constraint is that two wellbores cannot be too close to each other, which may be determined by the model.

Other constraints can easily be added while allowing the constraints to be evaluated in a reasonable period of time. In some embodiments, additional constraints limit the search space, as new configurations may be attempted only if the configurations adhere to all the constraints. In some embodiments, the model would be allowed to explore illegal configurations, but penalizing such configurations with a penalty proportional to the amount of the constraints that are broken. This penalty would then increase to a level where it would never be beneficial to the model to attempt illegal configurations which would lead to the same global optimum. However, this would enable to start in an illegal configuration to find a legal configuration.

In some embodiments, the model is an optimization model. It may, for instance, include a machine learning model. As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other machine learning algorithm or architecture that learns and approximates complex functions and generate outputs based on a plurality of inputs provided to the machine learning model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

In at least one embodiment, the system is representable by using a matrix:

$$X = \begin{bmatrix} \theta_1 & \theta_2 & \cdots & \theta_N \\ \phi_1 & \phi_2 & \cdots & \phi_N \end{bmatrix}$$

with the inclination $\theta_i$ and azimuth $\phi_i$ of wellbore i. In the case where no boundaries are given, the coordinates would also need to include a length $r_i$ of each wellbore.

This is used together with a matrix of wellhead positions:

$$W = \begin{bmatrix} x_1 & x_2 & \cdots & x_K \\ y_1 & y_2 & \cdots & y_K \\ z_1 & z_2 & \cdots & z_K \end{bmatrix}$$

and a list $M=[k_1 \ k_2 \ \ldots \ k_N]$ where $k_i$ is the index of the wellhead to which wellbore i belongs. The value $k_i$ thus means that the wellbore i has the wellhead position ($x_{k_i}$, $y_{k_i}$, $z_{k_i}$). If there is only one shared wellhead position where all wellbores start, this latter list is not necessary. In some embodiments, $z_k$ is a predefined constant, meaning that also these coordinates are also essentially 2D, from a function optimization perspective. In some examples, $z_k$ is chosen so that $z_k<0$, where positive direction is down into the formation. In such an example, having $z_k<0$ means that the wellhead is above ground level, which means that the wellbores do not meet up into a singularity at z=0.

Finally, there is an index i* that defines the index of a wellbore that adjusts its length to ensure that the total length of all wellbores is L' as per the equality constraint provided.

In this example, assuming that boundaries are given, each wellbore i may be constructed by starting at the wellhead position with index $k_i$, and extend the wellbore in a straight line with inclination $\theta_i$ and azimuth $\phi_i$ until it intersects a boundary of the site volume, such as the maximum allowable depth $D^*$ or any side of the polygon that defines the property limits (whatever is closer). The length $L_i$ of the wellbore is computed as the distance from where the well enters the ground at z=0 to where it is stopped by maximum depth or the polygon boundary. In some embodiments including an equality constraint on the maximum length of all wells, the length $L_i$ of the wellbore is calculated by defining a well i*, for which:

$$L_{i^*} = L^* - \sum_{i=1}^{i^*-1} L_i - \sum_{i=i^*+1}^{N} L_i$$

In other words, $L_{i^*}$ will be adjusted so that $\Sigma L_i = L^*$. This length might or might not be acceptable for the planned geothermal well or wellbore(s). For example, the result may be negative or exceed the maximum depth. Such is an example that may benefit from a model where such an infraction leads to a penalty, rather than to discard every such configuration, as discussed herein. This allows the system to start in a configuration where wellbore i* is outside of its allowed range, which is generally quickly solved by the model in order for the machine learning model to reduce the penalty of the infraction.

In some embodiments, a set (X, W, M, i*) describes a starting and end position of each wellbore, which means that it can be transformed into the necessary format of any function $f(Z)$ needed. For example, defining Z=(X, W, M, i*) allows consideration of the function $f(X, W, M, i^*)$.

In some embodiments, the function operates on a list of coordinates $V=[v_1 \ v_2 \ \ldots \ v_n]$, where $v_i$ defines the coordinates of object (e.g., wellbore) i. In some embodiments, V corresponds to X with $v_i=[\theta_i \ \phi_i]^T$ (for instance if the wellhead position(s) is/are already set), or W with $v_i=[x_i \ y_i \ z_i]^T$ if the wellbore orientations are already set but the wellhead positions are not). In another embodiment, a machine learning model, other model, or system of models according to the present disclosure operates on multiple lists in parallel, for example X and W. The model(s) may use a different radius for each (for example, due to the difference in coordinate system) within a single list:

$$V = \begin{bmatrix} \theta_1 & \ldots & \theta_N & x_1 & \ldots & x_K \\ \phi_1 & \ldots & \phi_N & y_1 & \ldots & y_K \\ & & & z_1 & \ldots & z_K \end{bmatrix}$$

which starts with inclination (θ) and azimuth (φ) of each wellbore and continues with the coordinates of the wellhead positions (x, y, z). In some embodiments, both are two-dimensional as the height $z_i$ of the wellhead position is a constant (set for instance to 0 or something slightly above ground to avoid a singularity if all wellbores meet at ground level).

A model f(V) is an optimization model set to optimize one or more parameters of the system. In some embodiments, a model $f(V)=s$, where s is the thermal recovery score of the configuration V, operates to find a local maximum for s. It should be understood that the thermal recovery score, which represents the efficiency of heat collection by the array of wellbores, is calculated in a negative value, wherein greater values (i.e., less negative values) reflect a more efficient recovery of thermal energy. Such optimization model may for instance include a function derived of a g-function, which represents the thermal resistance between the borehole and the ground. In some embodiments, the model uses a negative g-function as the model intends to maximize the optimization function.

However, other optimization functions, taking into account additional parameters, such as project constraints, like the cost, etc. might be used as well depending on the objective of the well placement. In a case where the illegal configurations are accepted, the optimization function may account for a penalty proportional to the amount of the constraints that are broken, in order to encourage the model to go to legal configurations.

In some embodiments, a method further includes defining a radius r that defines the search radius, and a function legal(V), that returns True if the configuration adheres to all constraints, and False otherwise. In the embodiment above where illegal configurations are accepted, the constraints are taken into account in the optimization function and the use of legal(V) may be optional. In at least one example tested, the function provides a planned geothermal well with a plurality of wellbores by initializing the model according to the following example.

The example includes generating at least one list V so that legal(V)=True. In some examples, generating the list V includes generating V randomly until a legal configuration is found by chance. In some embodiments, the list V is predetermined by a user or operator for an initial V that is known to be legal.

Then the example includes searching additional lists V so that legal(V)=True by generating variations of the initial list(s).

For each $v_i \in V$, the method includes creating k alternative positions $\{v_i^{(j)}\}_{j=1}^{k}$ at a distance r from the original, where j indicates the initial position and k indicates the number of the alternative position being evaluated. This can also be done in various embodiments, for example the method may sample in a defined pattern around $v_i$ ("pattern search"). If $v_i = [x_i \ y_i]^T$ i.e.:

$$v_i^{(j)} = \begin{bmatrix} x_i + r \cos\left(2\pi \cdot \dfrac{j}{k}\right) \\ y_i + r \sin\left(2\pi \cdot \dfrac{j}{k}\right) \end{bmatrix}$$

The method may sample randomly around $v_i$, ie.:

$$v_i^{(j)} = \mathcal{N}\left(v_i, r \cdot \sum\right)$$

which is a point randomly drawn from a multivariate normal distribution with mean $v_i$ and covariance matrix r·Σ.

In some embodiments, the method includes, for each alternative position $v_i^{(j)}$, creating a configuration according to:

$$V^{(j)} = [v_1 v_2 \ \ldots \ v_i^{(j)} \ \ldots \ v_n]$$

In instances when a value for $V^{(j)}$ is legal, where $f(V^{(j)}) > f(V)$, the method then replaces V by $V^{(j)}$. In some embodiments, upon exhaustion of all variations to v; without improvement to the value(s) of V, the method includes decreasing r with a factor A so that r←λ·r, where 0<λ<1. In some embodiments, when r<$r_*$, the method or model stops.

This is an example, but the method may stop upon completion of other criteria, such as number of iterations without improvement of the optimization function score, fixed number of iterations, etc.

In at least one example tested, a model according to at least one embodiment described herein was initialized according to the following initialization values. Total length for all wellbores: L*=1800. Minimum length of a wellbore: l*=50. Maximum angle of a wellbore: θ*=20°. Maximum allowable depth: D*=200. Area of property limits: x∈[−30, 30], y∈[−30, 30]. Wellhead position: [0,0,−1].

In this example, the model is configured to determine inclination and azimuth of all wellbores starting from a unique wellhead:

$$X = \begin{bmatrix} \theta_1 & \theta_2 & \ldots & \theta_N \\ \phi_1 & \phi_2 & \ldots & \phi_N \end{bmatrix}$$

and a length of a final wellbore i* to adjust so that total length is L*.

An evaluation of any well according to the present disclosure is performed, according to at least some embodiments, using a function $f(X, i^*)$ that acts as a heuristic for optimizing how much geothermal energy can be extracted from the ground. Some general features are that the function values depend on include a length of each wellbore, since a longer well has more surface for absorbing energy; a depth of the wellbore, as temperature difference will be greater at greater depth; and a volume of formation between wellbores, so that the wellbores do not each receive thermal energy from an overlapping region. In some embodiments, the model allows a wellbore or wellbores shorter than l*, but the machine learning model or other model adds a penalty proportional to (l*−$l_{min}$) to the optimization model if the shortest well is shorter than l*. Therefore, the model can evaluate and learn from non-compliant wellbore lengths but will be discouraged from accepting or will not accept a final solution if any well is shorter than l*.

In the described example, a pattern search was used to create alternative positions according to:

$$\{v_i^{(j)}\}_{j=1}^{k}$$

Where $v_i$ is each well position. The values were selected according to: k=24 (e.g., 24 positions) and the alternative positions were evenly spaced on a circle of radius r around each well position $v_i=[\theta_i, \phi_i]^T$. If this results in $\theta_i^{(j)} > \theta^*$, then $\theta_i^{(j)} \to \theta^*$. The radius r was initialized at 32°, and the optimization ends when r<0.1°. The radius r decays with a factor $\lambda=0.5$ once every wellbore has been tested using the current r without improvements. In some embodiments, when no wellbore can be improved with the current value of r, the machine learning model or other model updates i* through a plurality of values. The machine learning model or other model defines i* to be the value that provided the better results.

Figure 3:
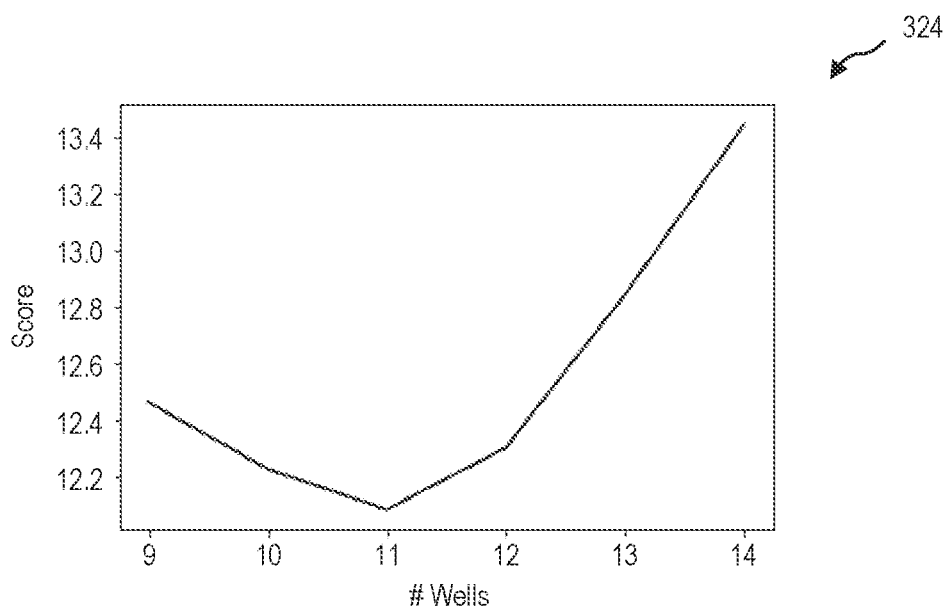
FIG. 3 is a graph illustrating the change in thermal recovery scores of geothermal wells of different wellbore quantities, according to some embodiments of the present disclosure.

In the example described above with the defined settings for different amounts of wellbores, the model provided the graph 324 illustrated in FIG. 3, after attempting each setting one time. To analyse the effect of initialization, the model was run 12 times, with the setup of 11 wells. The model produces a mean score of −12.13 with a standard deviation of 0.13, in the range of [−11.96, −12.34].

In the described example, an array of 11 wellbores was determined to be the lowest (best) value. In some embodiments, an array with too few wells, such as 9, results in all wells needing to be as long as possible in order to meet the prescribed total length of 1800 m. This forces the wells to be closer than optimal to each other which makes their regions of heat exchange overlap more. In some embodiments, an array with too many wells, such as 14, results in all wells needing to be as short as possible in order to meet the total length constraint. This again creates unnecessary overlap of the heat exchange regions of the wells while further leaving the bottom region of the site volume unexploited.

Figure 4:
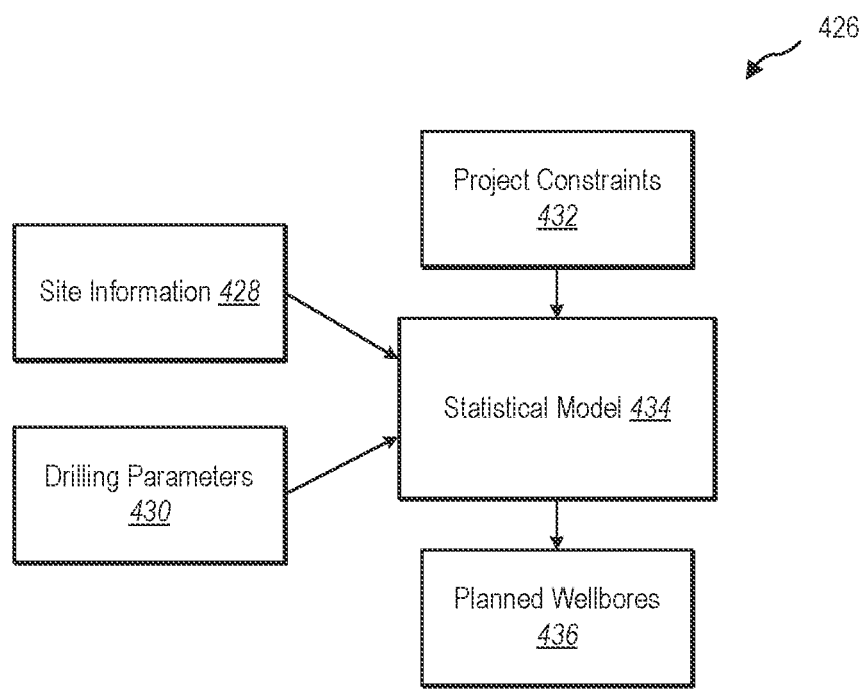
FIG. 4 is a flowchart illustrating inputs and output of a statistical model, according to some embodiments of the present disclosure.
Figures 1, 5:
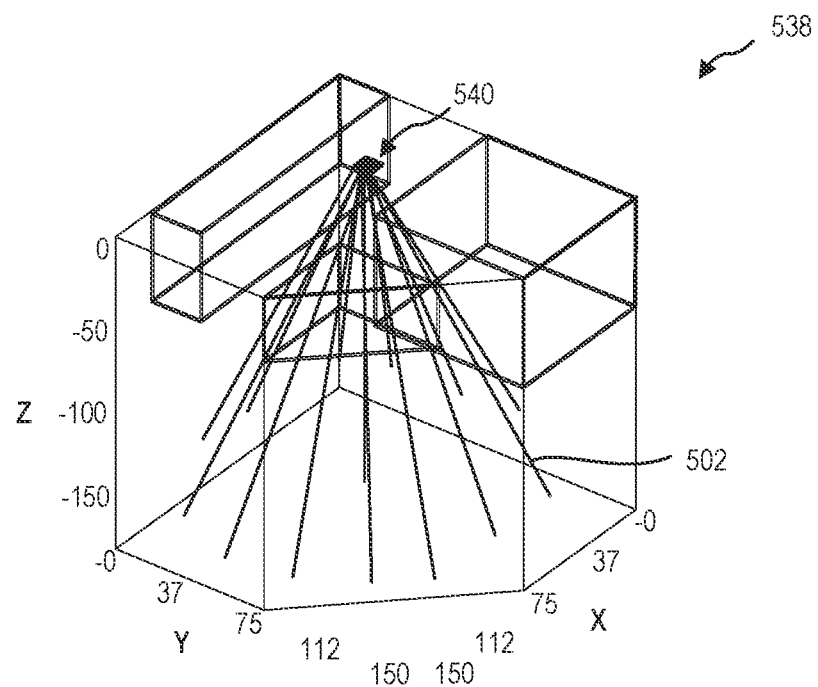
Figures 2, 5:
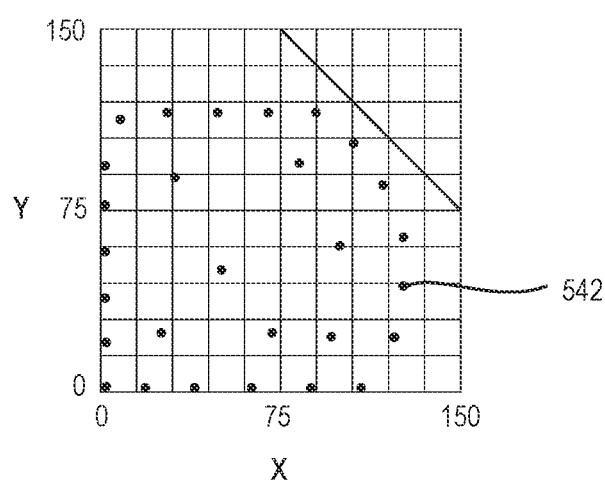

FIG. 4 is a flowchart 426 illustrating the inputs of site information 428, drilling parameters 430, and project constraints 432 into the statistical model 434 as described in the above example. The model 434 then provides the values including at least azimuth and inclination angle of the planned wellbores 436 according to the lowest value calculated. In some embodiments, the planned wellbores originate from approximately a single wellhead and fan out from the single wellhead. FIG. 5-1 is a perspective view of an array 538 of planned wellbores 502 produced by the machine learning model or other model described in relation to FIG. 2 and FIG. 3. The planned wellbores 502 originate from an approximate single wellhead 540 with the origin located at a height (z-value) above the surface to avoid a singularity. FIG. 5-2 illustrates the location of the downhole ends 542 of the planned wellbores at the lower portion of the site volume to distribute the wellbores throughout the site volume. In the embodiment, illustrated in FIGS. 5-1 and 5-2, the downhole ends form an arc segment when the wellbores are unobstructed by building foundations or other non-building zones. In other regions of the array of planned wellbores, the building foundations or other non-building zones obstruct the wellbores and result in a linear arrangement of the downhole ends in the site volume according to the edge(s) of the building foundations or other non-building zones.

Figures 1, 6:
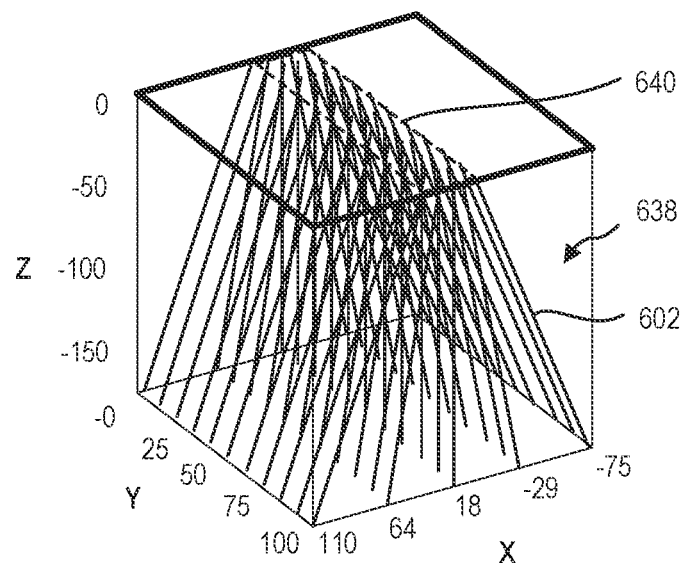
Figures 2, 6:
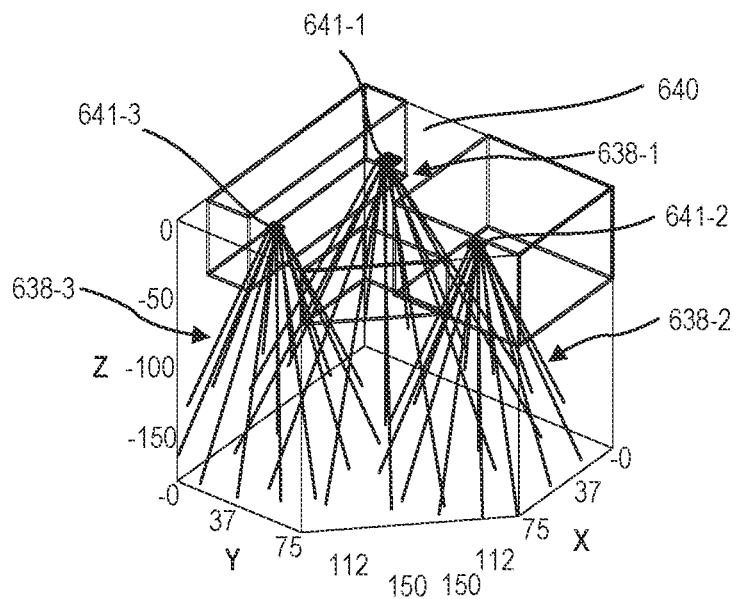

In some embodiments, the shared wellhead is not a single wellhead, but rather a region of allowable wellheads for the array of planned wellbores. FIG. 6-1 illustrates an embodiment of an array 638 of planned wellbores 602 with shared wellhead region 640 that runs the full length of a surface of the site volume. The planned wellbores then extend downward in a series of wellhead locations. Each wellhead location has a fan of planned wellbores 602 associated therewith. In such an example, the fans of planned wellbores are parallel to one another, where each fan defines a plane parallel to an adjacent plane. In some embodiments, a plurality of wellbores originates from a shared container at the surface. In some embodiments, the array 638 includes a plurality of containers at the surface located in the wellhead region 640. For example, the wellhead region 640 of FIG. 6-2 includes a plurality of wellpads 641-1, 641-2, 641-3 where each wellpad 641-1, 641-2, 641-3 in the shared wellhead region includes a subarray 638-1, 638-2, 638-3 of wellbores. In addition to other properties or values of the geothermal well, a model according to the present disclosure, in some embodiments, calculates the position of one or more wellpads 641-1, 641-2, 641-3 and/or shared wellheads in the shared wellhead region 640 as explained above.

Figure 7:
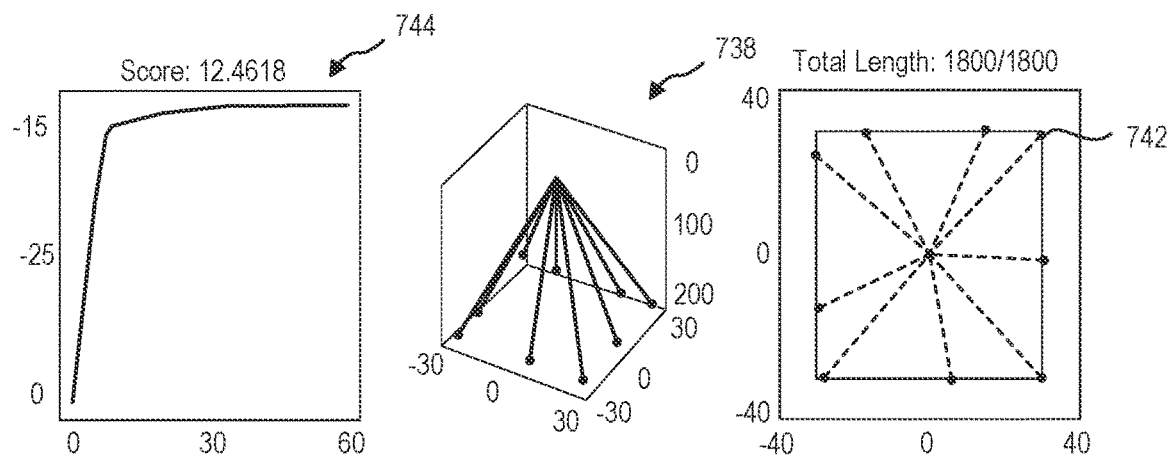
FIG. 7 illustrates the results of a statistical model calculating a thermal recovery score for a geothermal well with 9 wellbores, according to some embodiments of the present disclosure.
Figure 8:
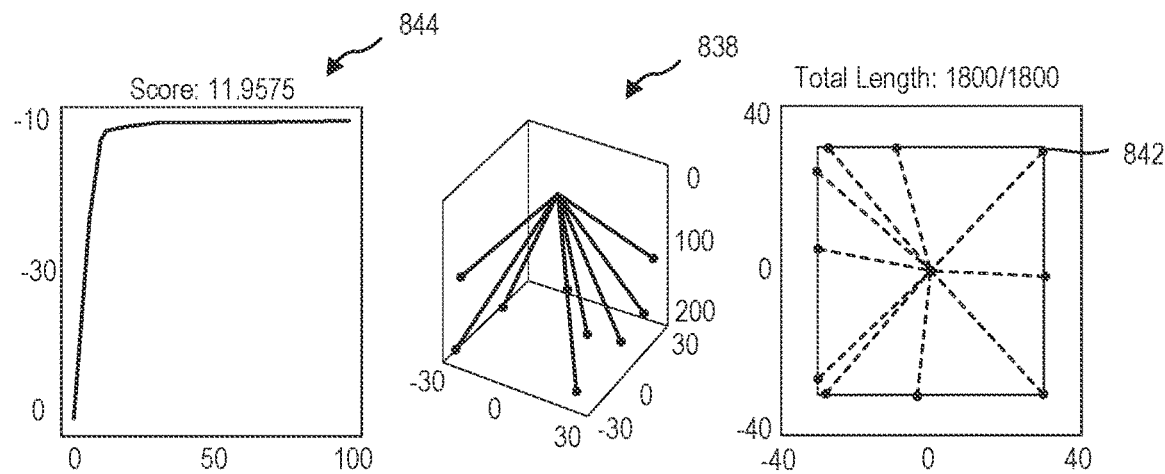
FIG. 8 illustrates the results of a statistical model calculating a thermal recovery score for a geothermal well with 11 wellbores, according to some embodiments of the present disclosure.
Figure 9:
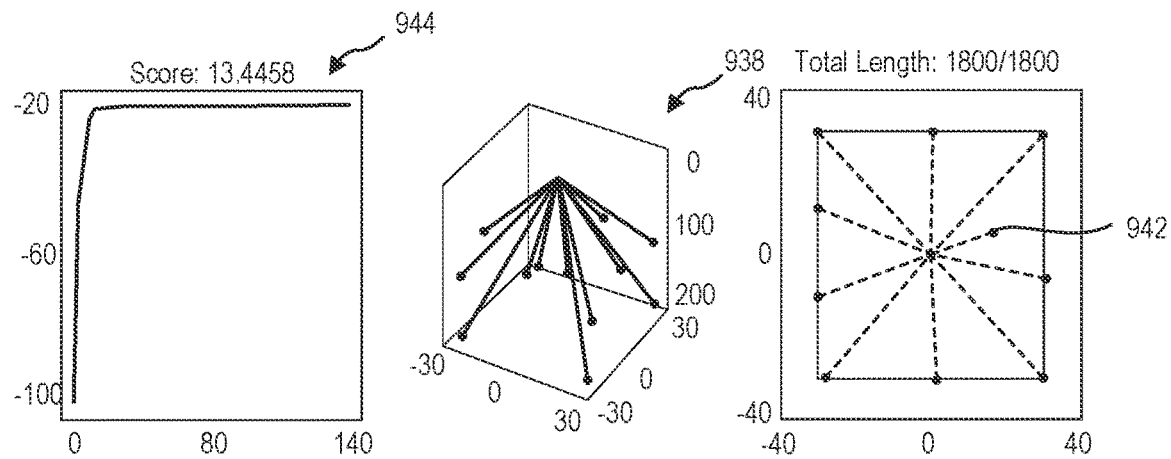
FIG. 9 illustrates the results of a statistical model calculating a thermal recovery score for a geothermal well with 13 wellbores, according to some embodiments of the present disclosure.

FIG. 7 through FIG. 9 illustrate arrays of planned wellbores with associated thermal recovery scores for arrays of 9, 11, and 14 wellbores, respectively. FIG. 7 illustrates the output planned wellbores for an array of 9 wellbores. The machine learning model or other model produced a thermal recovery score of −12.4618 after 60 iterations of the model, as shown in the lefthand graph 744. The array of planned wellbores produced by the model required that all wells are as long as possible to achieve the required total length of 1800 m selected during initialization of the model. Upon achieving a consistent series of iterations with no improvement to the thermal recovery score (or improvement to the thermal recovery score less than a predetermined threshold value), the machine learning model or other model terminated and presented the results of the planned well shown in the center array 738 and the righthand bottom view of the wellbore ends 742 of FIG. 7.

In some embodiments, when the quantity of wellbores in the array are too low, all or all but one of the wellbores is a maximum allowable depth to achieve or approach the minimum total length. In some embodiments, when all or all but one of the wellbores is determined to be the maximum allowable depth to achieve or approach the minimum total length, the machine learning model or other model may increment the quantity of wellbores in the array by one and recalculate the array of planned wellbores.

FIG. 8 illustrates the results of a model with an input of 11 wellbores for the calculated array of planned wellbores. With two additional planned wellbores in the array, the machine learning model or other model produced a thermal recovery score of −11.9575 after 100 iterations of the model, as shown in the lefthand graph 844. The array of planned wellbores produced by the model allowed a variety of wellbore lengths to achieve the total length of 1800 m selected during initialization of the model. Upon achieving a consistent series of iterations with no improvement to the thermal recovery score (or improvement to the thermal recovery score less than a predetermined threshold value), the machine learning model or other model terminated and presented the results of the planned well shown in the center array 838 and the righthand bottom view of the wellbore ends 842 of FIG. 8.

In some embodiments, the model increments the quantity of planned wellbores in the array and calculates a new thermal recovery score for the incremented quantity. In response to the thermal recovery score increasing such as described in relation to FIG. 3, the model may terminate and present the better score.

FIG. 9 illustrates the result of the model with an input of 13 wellbores for the calculated array of planned wellbores, which results in a more negative (i.e., worse) thermal recovery score than the 11-wellbore solution described in relation to FIG. 8. With two additional planned wellbores in the array, the machine learning model or other model produced a thermal recovery score of −13.4458 after 140 iterations of the model, as shown in the lefthand graph 944. The array of planned wellbores produced by the model required the wellbore lengths to be truncated (which forces the wellbores closer to one another and reduces thermal recovery efficiency) to achieve the total length of 1800 m selected during initialization of the model. For example, the minimum length of a planned wellbore in the 13-wellbore array is 49 meters compared to 114 meters in the 11-wellbore array and 178 meters in the 9-wellbore array. Upon achieving a consistent series of iterations with no improvement to the thermal recovery score (or improvement to the thermal recovery score less than a predetermined threshold value), the machine learning model or other model terminated and presented the results of the planned well shown in the center array 938 and the righthand bottom view of the wellbore ends 942 of FIG. 9.

In some embodiments, a method of producing a geothermal well and/or the machine learning model or other model implemented in planning the geothermal well increments the quantity of wellbores are reports or displays the array of planned wellbores (including the associated quantity of wellbores) that provides the least negative and/or better thermal recovery score. In some embodiments, the method of producing a geothermal well and/or the machine learning model or other model further determines the better thermal recovery score relative to cost of producing the geothermal well. In at least one embodiment, the cost of producing the geothermal well is amortized over an expected operational lifetime of the geothermal well. In at least one embodiment, the cost of producing the geothermal well is at least partially offset by the expected value of the thermal recovery from the geothermal well based at least partially on the thermal recovery score calculated for the array of planned wellbores of the geothermal well.

In some embodiments, a well placement model, such as any of the statistical models and/or machine learning models described herein, is included in a statistical system or model that considers additional constraints or requirements. In some examples, the additional constraints or requirements include, but are not limited to, a building thermal demand over a given period of time (e.g., "lifetime") such as 25 years; the surface equipment space requirements; the surface equipment cost(s); the ground thermal properties such as thermal conductivity, thermal capacity, undisturbed temperatures relative to depth, presence of aquifers; and other constraints or requirements.

The well placement model, in some embodiments, calculates the minimum total length of wellbore in the well to be drilled to meet the additional constraints or requirements. In some embodiments, the well placement model calculates the greatest thermal recovery score based on a maximum allowed total cost of drilling the well and installing borehole heat exchanger. In some embodiments, the well placement model calculates the greatest thermal recovery score based on a maximum allowed total cost of drilling the well and of installing and operating borehole heat exchanger over the lifetime of the geothermal well.

Figure 10:
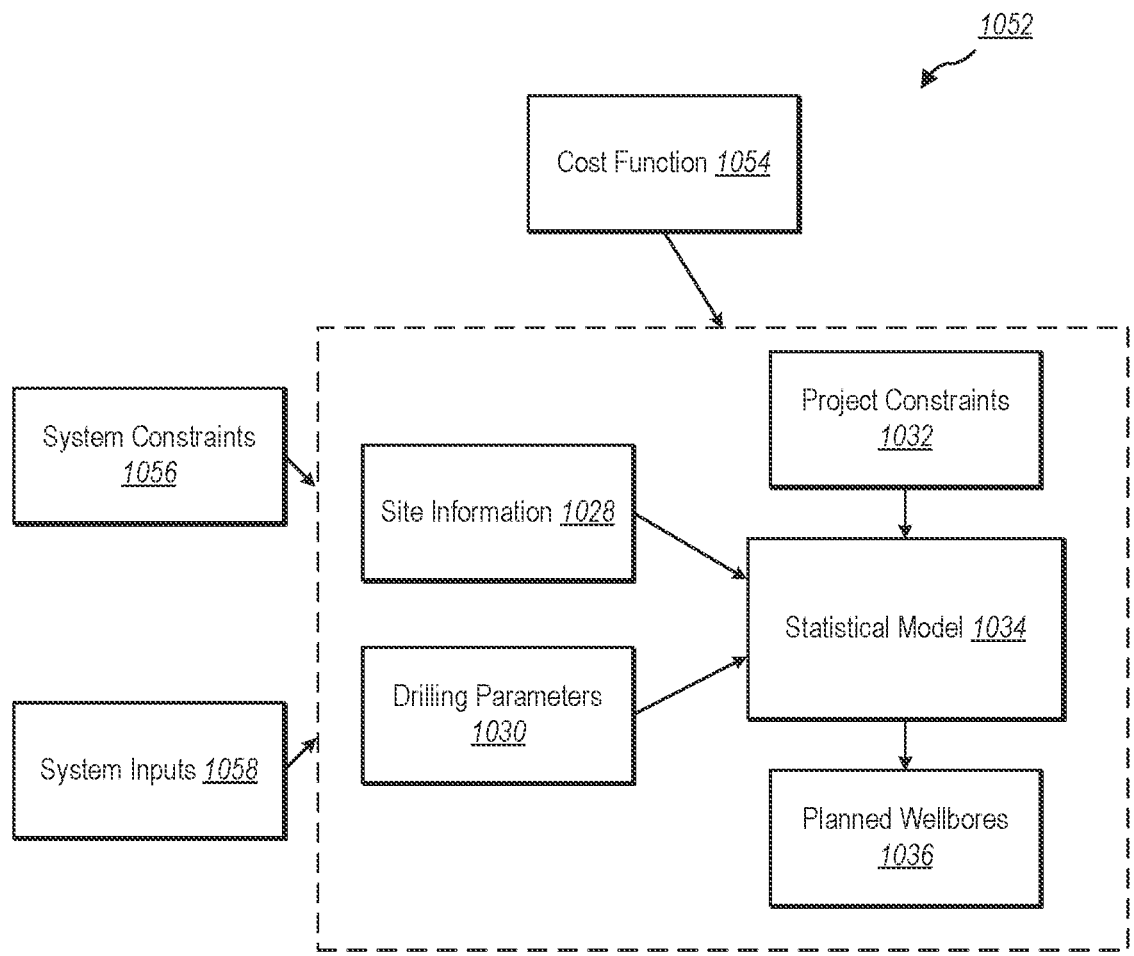
FIG. 10 is a flowchart illustrating additional inputs and output of a statistical model, according to some embodiments of the present disclosure.

FIG. 10 is a flowchart 1052 including a statistical model 1034 and inputs to the statistical model 1034 such as that described in relation to FIG. 4. In some embodiments, additional constraints or requirements are input to the statistical model 1034 in addition to the site information 1028, the drilling parameters 1030, and the project constraints 1032 described herein. The constraints or requirements include, in some embodiments, a cost function 1054. For example, the cost function 1054 may be any function that defines the cost to start a wellbore, the cost-per-meter of a wellbore, the cost of operating the well, the cost relative to inclination or orientation of the wellbore(s), the cost relative to depth of the wellbore(s), the cost for surface equipment or construction (e.g., ditches and/or connections), the cost of subsurface equipment (e.g., borehole heat exchanger), costs offset by thermal recovery, or other costs associated with the creation or operation of the wellbore.

The statistical model 1034 further receives, in some embodiments, system constraints 1056 and/or system inputs 1058. For example, the system constraints 1056 may include a range of allowable fluid temperature at an inlet of the borehole heat exchanger, such as a range of −3° C. to +40° C. The range of allowable fluid temperatures may place further constraints on the location, orientation, depth, or other calculated values of the planned wellbores 1036. In another example, the system constraints 1056 may include a thermal recovery requirement, such as a nominal value or a proportionate value that is relative to a total building thermal demand of buildings or other structures heated (or cooled) by the geothermal well. In at least one example, the system constraints 1056 include a thermal recovery requirement of at least 60% of the total building demand be produced by the geothermal well and the planned wellbores 1036 thereof. In yet another example, a system constraint may include a location of an aquifer to avoid.

In some embodiments, the system inputs 1058 include ground properties in addition to the site information, total building thermal demand, seasonal thermal demand information, heat pump or heat exchanger properties, etc. The system inputs 1058 may provide additional nominal or relative values used by the cost function 1054 and/or statistical model 1034 to determine the planned wellbores 1036.

As described herein, a thermal recovery score of an array of planned wellbores is based at least partially on the spatial relationship of the planned wellbores within the site volume and the thermal recovery rates from the formation in which the wellbores are drilled. While the site information and drilling parameters obtained and input into the model include the best available information, in some embodiments, the actual information of the site volume, formation information, thermal recovery rates, drilling efficiencies, drilling accuracy, etc. may vary from the input values. In at least one example, a first drilled wellbore of a geothermal well may deviate from the location of an associated first planned wellbore location. In at least another example, a thermal transfer rate of a first drilled wellbore of a geothermal well may vary from the expected thermal transfer rate of the associated first planned wellbore location, even if the drilled wellbore is in the planned wellbore location.

Figure 11:
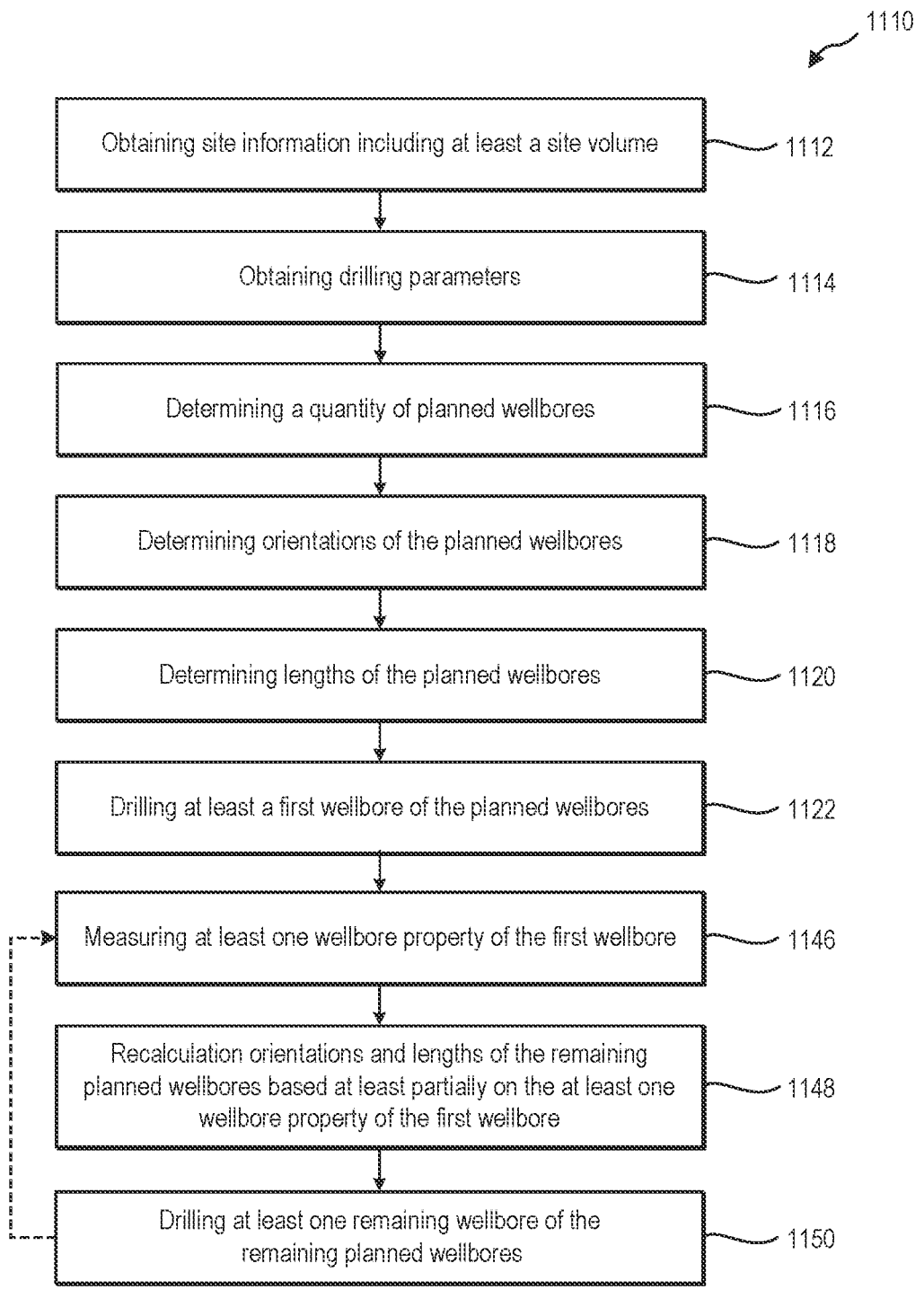
FIG. 11 is a flowchart illustrating a method of producing a geothermal well with recalculated orientation and lengths of wellbores during the drilling process, according to some embodiments of the present disclosure.

In some embodiments, planning an array of wellbores for thermal recovery includes drilling at least one wellbore and replanning the array of planned wellbores based on properties or parameters of the drilled wellbore measured during or after drilling the drilled wellbore. FIG. 11 is a flowchart illustrating a method 1110 of producing a geothermal well including dynamically replanning at least some planned wellbores of the geothermal well.

In some embodiments, the method 1110 includes obtaining site information including at least a site volume at 1112.

In some embodiments, obtaining the site information includes accessing the site information from a local hardware storage device. For example, a hardware storage device is any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. In some embodiment, obtaining the site information includes accessing the site information from a remote storage device, such as a cloud storage device or server computer.

The site information includes at least a site volume that is defined by a property limit and a maximum allowable depth. In some embodiments, the site volume further includes no-drill zones that will limit the positioning of planned wellbores within the site volume. In some embodiments, the site information includes a geothermal profile of the site. For example, different properties of the site may affect the geothermal properties, such as groundwater presence, formation composition, and other underground structures such as other pipes and wells. In some embodiments, the site information further includes an allowed drilling area located at the surface of the site volume. In some embodiments, the method 1110 further includes obtaining drilling parameters at 1114. The drilling parameter may include wellbore properties including a thermal transfer rate, a cost-per-meter for drilling a wellbore in the geological formation, a cost-per-start for each wellbore, a drilling rate, a maximum angle, a minimum wellbore length, a maximum wellbore length, a maximum well length (e.g., total length of the wellbores), minimum distance between wellbores, and other properties of the drilling and costs associated therewith. The drilling parameters allow a machine learning model or other model to determine the planned geothermal well when considered in context of the site information.

The method 1110 includes determining a quantity of planned wellbores having a shared wellhead at 1116 before determining orientations of the planned wellbores at 1118 and determining lengths of the planned wellbores at 1120. In some embodiments, determining the quantity of planned wellbores includes receiving a predetermined quantity of planned wellbores from an operator. For example, drilling constraints may limit the ability of a drilling team to produce the geothermal well, limiting the quantity of wellbores. In other examples, the quantity of planned wellbores may be selected by an operator based on the cost of BHEs or other materials involved with the construction of the geothermal well and associated HVAC equipment. In some embodiments, a model iterates through a plurality of instances to determine the quantity of planned wellbores, as described herein.

Determining the orientations and determining the lengths of the planned wellbores as well as the wellhead coordinates is based at least partially on the site information and the drilling parameters. For example, an orientation and length of the planned wellbore may be based at least partially on a maximum allowable depth of the site volume and/or a maximum angle of the wellbore relative to the surface. In some examples, the orientation and length of the planned wellbore may be based at least partially on the geothermal profile of the site volume, such as the temperature increasing proximate a lower region of the site volume or a presence of groundwater in the site volume limiting a length of the wellbore.

The method 1110 further includes drilling at least a first drilled wellbore according to a first planned wellbore location at 1122. In some embodiments, the method 1110 includes measuring at least one wellbore property of the first drilled wellbore at 1146. In some examples, the wellbore property is measured during drilling of the first drilled wellbore. In some examples, the wellbore property is measured after drilling the first drilled wellbore. In some embodiments, the wellbore property includes a location of the drilled wellbore, such as a location of the downhole end of the drilled wellbore or a substantially continuous measurement of the location of the drilled wellbore along at least a portion of the length of the drilled wellbore in the site volume; an orientation of the drilled wellbore, such as an average orientation or a substantially continuous measurement of the orientation of the drilled wellbore along at least a portion of the length of the drilled wellbore in the site volume; a length of the drilled wellbore; a depth of the drilled wellbore; formation properties including formation composition, water production, fractures, etc.; thermal transfer rate from the formation; thermal recovery rate from the formation to a BHE for the drilled wellbore; and drilling cost for the drilled wellbore, such as cost-per-foot for drilling the drilled wellbore and start cost for drilling the drilled wellbore. For example, the start cost for drilling a drilled wellbore may be greater than expected, rendering less but longer wellbores more economical in the drilling costs for the geothermal well. In at least one example, the orientation of the wellbore is measured via an inclinometer and compared to the orientation of the planned wellbore.

The wellbore property is used in recalculating orientations and lengths of the remaining planned wellbores based at least partially on the at least one wellbore property at 1148. For example, the measured wellbore property (or a calculated wellbore property based on a measured wellbore property) is provided as an input to the machine learning model or other model described herein. The machine learning model or other model then determines orientations and lengths of the remaining planned wellbores of the geothermal well, and optionally wellhead location, relative to the known location, orientation, and/or length of the drilled wellbores.

The method 1110 further includes drilling at least one remaining wellbore of the remaining planned wellbores that were calculated based at least partially on the at least one wellbore property at 1150. In some embodiments, the method 1110 includes drilling all remaining wellbores of the remaining planned wellbores. In some embodiments, the method 1110 includes drilling one remaining wellbore of the remaining planned wellbores and subsequently measuring at least one wellbore property of the immediately previously drilled wellbore (i.e., the newly drilling wellbore) at 1146. The method 1110, in some embodiments, then cycles by recalculating orientations and lengths of the remaining planned wellbores based at least partially on the at least one wellbore property of the immediately previously drilled wellbore. In such an example, the array of remaining planned wellbores is recalculated after each wellbore is drilled and at least one wellbore property of the immediately previously drilled wellbore is measured. In some embodiments, the orientations and lengths of remaining planned wellbores are recalculated after only the first drilled wellbore, as many of the relevant wellbore properties (pertaining to other wellbores in the geothermal well) may be measurable from the first drilled wellbore.

In some embodiments, the orientations and lengths of remaining planned wellbores are recalculated at intervals, such as every two wellbores. In some embodiments, at least one wellbore property is measured during or after each drilling wellbore is drilled, but the orientations and lengths of remaining planned wellbores are only recalculated when a value of the measured wellbore property is outside of an expected range of values. For example, the orientations and lengths of remaining planned wellbores are recalculated when the orientation of a drilled wellbore is out of the planned specification by at least 2° or another predetermined threshold, otherwise, the orientations and lengths of remaining planned wellbores are not recalculated. In another example, the orientations and lengths of remaining planned wellbores are recalculated when the drilling cost (e.g., cost-per-foot and/or start cost) of a drilled wellbore is out of the planned specification by at least 5% or another predetermined threshold, otherwise, the orientations and lengths of remaining planned wellbores are not recalculated.

It should be understood that while embodiments of methods for planning and creating a geothermal well are described herein, embodiments of systems and/or computer readable media having instructions for performing the method are contemplated within the scope of this disclosure. In some embodiments, computer-readable media (CRM) (such as a hardware storage device or other non-transitory media) contains instructions stored thereon that, when executed by a computing device or a processor of a computing device, cause a computing device to perform one or more portions of any method described herein. For example, a CRM may include instructions that cause a computing device to perform at least some of the method described in relation to FIG. 2. In other examples, a CRM may include instructions that cause a computing device to perform at least some of the method described in relation to FIG. 11. In some examples, a CRM may include instructions that cause a computing device to perform at least some of the statistical models, optimization models, machine learning models, or other models described herein.

Figure 12:
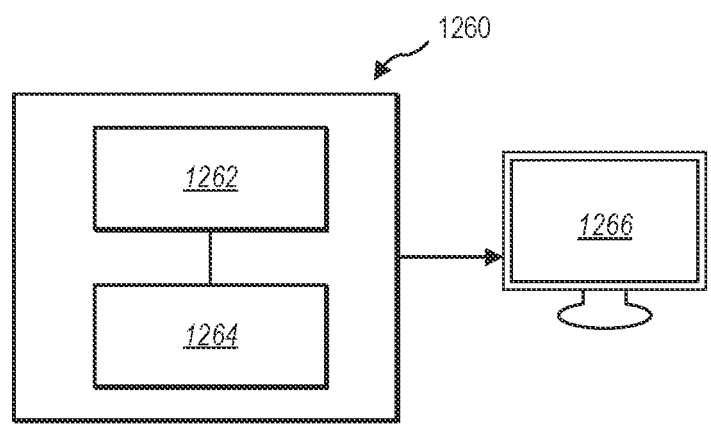
FIG. 12 is a system diagram illustrating a system for planning a geothermal well, according to some embodiments of the present disclosure.

In some embodiments, a system 1260 for planning and creating a geothermal well includes at least a processor 1262 and a hardware storage device 1264, such as illustrated in FIG. 12. In some embodiments, the hardware storage device 1264 is a non-transient storage device including any of RAM, ROM, EEPROM, CD-ROM or other optical disk storage (such as CDs, DVDs, etc.), magnetic disk storage or other magnetic storage devices, or any other medium which can be used to store desired program code in the form of computer-executable instructions or data structures and which can be accessed by a general purpose or special purpose computer. The hardware storage device 1264, in some embodiments, includes instructions stored thereon that cause the system 1260 to perform one or more portions of any method described herein. In some embodiments, the system 1260 is configured to display or otherwise present one or more visualizations to a user of an output of the method or models stored on the hardware storage device 1264 to a display 1266.

Figure 13:
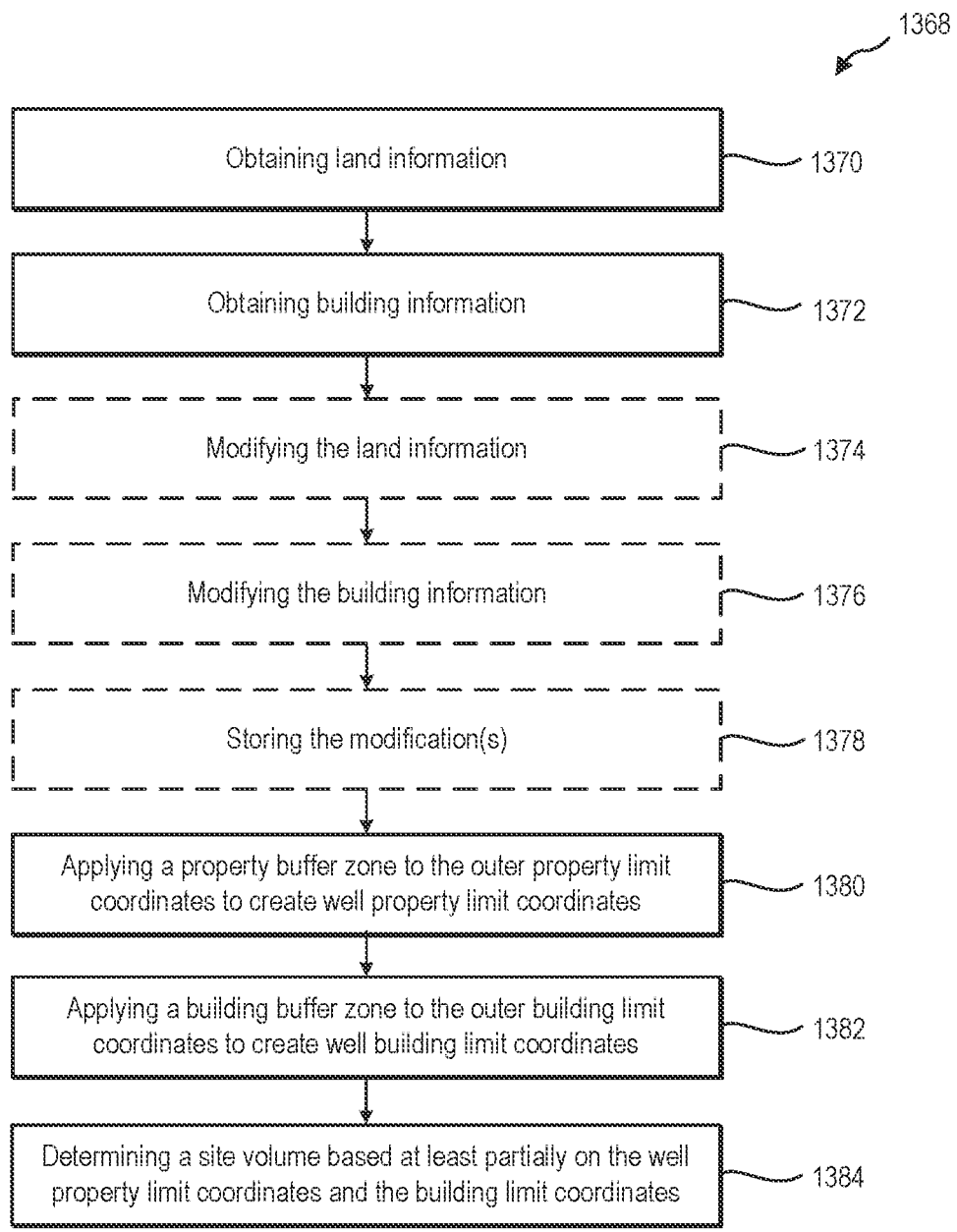
FIG. 13 is a flowchart illustrating a method of obtaining site information, according to some embodiments of the present disclosure.

FIG. 13 is an embodiment of a method 1368 of obtaining site information, such as described at least in relation to FIG. 2 and FIG. 11. In some embodiments, obtaining site information includes automatic detection of site information based at least partially on a land register and/or building data and/or any other data relative to an element of concern of the surface or subsurface (for instance, vegetation or water zones, urban cable or pipe networks for the provision of water, gas, electricity, etc). Such elements of concern may be determined taking into account the local legal constraints, for instance. For example, a system may obtain coordinate information for property boundaries and/or building boundaries and/or cable or pipe networks location and/or vegetation or water zones boundaries (or the boundaries of any other element of concern) and automatically determine the site volume in which the well may be formed.

In some embodiments, the method 1368 includes obtaining land information at 1370. In some examples, obtaining the land information includes accessing a public land register. In some examples, the land register includes property limit coordinates in the land register to designate a location of the property (e.g., latitude and longitude coordinates for the corners of the property). In some examples, the land register includes a bearing (e.g., orientation) and dimension (e.g., length) of one or more boundaries of the property from which property limit coordinates may be calculated. In some embodiments, obtaining the land information includes calculating at least one portion of the property limit coordinates based on the land information. In some embodiments, obtaining the land information includes calculating all of the property limit coordinates based on the land information. For example, the land information may include a coordinate location for a reference corner of a rectilinear property with dimensions for a length and width of the property. The property limit coordinates are calculated based on the bearing and dimension of each side of the property from the coordinate location of the reference corner.

In some embodiments, obtaining land information includes extending the property limit coordinate vertically downward into a subsurface space. For example, most site volumes are bounded horizontally by the property limit coordinates while drilling permissions extend downward from those property limit coordinates. In some embodiments, subsurface access rights extend laterally beyond the property limit coordinates at the surface.

In some embodiments, the method 1368 of obtaining the site information further includes obtaining building information at 1372. For example, obtaining the building information may include accessing the same source from which the land information is obtained. In other examples, obtaining the building information may include accessing a different source than the land information. In at least one example, the building information may be obtained from a public recorder's office. In some embodiments, the building information includes surface building information and/or subsurface building information for structures on the site. In some embodiments, the surface building information includes surface building limit coordinates (e.g., latitude and longitude coordinates for the corners of the building). In some embodiments, the surface building information includes a location of the building relative to the property limits of the property. For example, the surface building information designates that the building is 5 meters from the south edge of the property. In some embodiments, the surface building limit coordinates are at least partially calculated from the surface building information.

In some embodiments, obtaining the building information includes obtaining subsurface building limit coordinates. For example, the source of the building information may further includes surface building limit coordinates for a foundation, a basement, or other subsurface structures of the building(s) on the site. In some embodiments, the building information may include or indicate the presence of a subsurface level or structure of the building(s) on the site. In such an example, obtaining the subsurface building limit coordinates may include extending the surface building limit coordinates downward into the subsurface space by a fixed amount per "level" of subsurface structure. In at least one example, a public register provides the surface building limit coordinates and indicates the building has a basement, and obtaining the subsurface building limit coordinates includes extending the surface building limit coordinates downward a fixed amount (e.g., 3 meters).

In some embodiments, the method 1368 optionally includes modifying the land information at 1374. For example, modifying the land information may include receiving a user input to correct or modify at least one property limit coordinate. In a particular example, the property limit coordinate may be incorrected reported by a register or may be located in or under an unreported or misreported structure or easement. For example, a user may desire to measure the site volume from a road edge while the property limit coordinates are located in a centerline of the road. In other examples, a plurality of adjacent properties may be grouped together to define a single set of property limit coordinates that bound multiple properties. In at least one embodiment, the method 1368 includes automatically grouping properties and calculating a single set of property limit coordinates that bound multiple properties. For example, a first property and a second property that are adjacent to one another (i.e., having a shared property boundary) with a building (i.e., building limit coordinates) that spans the shared property boundary may be automatically grouped for the purposes of a determining the property limit coordinates and site information.

In some embodiments, the method 1368 optionally includes modifying the building information at 1376. For example, the obtained building limit coordinates may include an error in placement or dimensions of the building. In another example, the obtained building limit coordinate may include as part of the building a courtyard, patio, driveway, deck, awning, or another structure or feature of the building under which there is no foundation or no structural concern drilling underneath. In some embodiments, modifying the building information may include receiving a user input to correct or modify at least one building limit coordinate (i.e., surface building limit coordinate or subsurface building limit coordinate).

In some embodiments, the method 1368 optionally includes modifying any other data relative to one or more elements of concern (such as vegetation or water zones, urban pipe or cable networks).

In some embodiments, the method 1368 optionally includes storing the modification(s) at 1378. The modified land information and/or building information may be stored on a hardware storage device locally or remotely for future access. In some embodiments, the modified land information and/or building information may be accessed or retrieved at a future time to continue planning a well. In some embodiments, the modified land information and/or building information is input to a statistical model to further refine a statistical model for the automatic calculation of a site volume.

In some embodiments, the method 1368 includes applying a property buffer zone to the outer property limit coordinates to create well property limit coordinates at 1380. The property buffer zone is an offset or setback from the property limit coordinates toward an interior area of the property in which the site volume is calculated. In some locations, a property buffer zone is mandated by law or regulation. In some instances, a user sets or modifies the property buffer zone according to a project plan to ensure the property limits are not exceeded. In at least one example, a drilled wellbore may deviate from the planned location in a lateral direction, and a property buffer zone allows for some deviation from the planned location without exceeding limits.

In some embodiments, the method 1368 includes applying a building buffer zone to the outer building limit coordinates to create well building limit coordinates at 1382. The building buffer zone is an offset or setback from the building limit coordinates toward an interior area of the property (i.e., away from the building volume) in which the site volume is calculated. In some locations, a building buffer zone is mandated by law or regulation. In some instances, a user sets or modifies the building buffer zone according to a project plan to ensure the building limits are not exceeded. In at least one example, a drilled wellbore may deviate from the planned location in a lateral direction, and a building buffer zone allows for some deviation from the planned location without exceeding limits.

The method 1368 further includes determining a site volume based at least partially on the property limit coordinates and the building limit coordinates at 1384. In some embodiments, determining the site volume includes calculating the site volume based at least partially on the property limit coordinates and the building limit coordinates with the property buffer zone and the building buffer zone applied.

Figure 14:
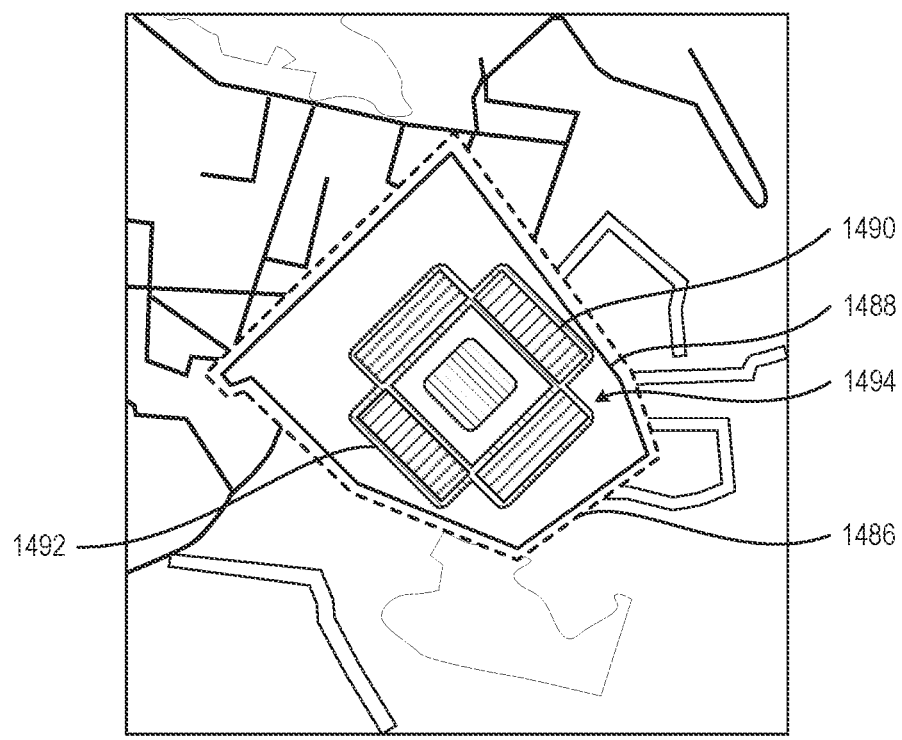
FIG. 14 is a user interface that allows at least a portion of the method of FIG. 13, according to some embodiments of the present disclosure.

FIG. 14 is an embodiment of a visualization of a method of obtaining site information, such as described in relation to FIG. 13. In some embodiments, a map field of a user interface displays to a user the property limit as determined by the property limit coordinates 1486 obtained according to the method of FIG. 13. The user interface visually represents the available portion of the property after applying a property buffer zone 1488 to the property limit coordinates 1486. The user interface further visualizes a no-drill zone based on the building information according to the building limit coordinates 1490 with a building buffer zone 1492 applied thereto. In some embodiments, modifications to the property limit coordinates 1486, to the property buffer zone 1488, the building limit coordinates 1490, the building buffer zone 1492, etc. may be provided to the application through the user interface, such as be sliders or other input fields or such as by manipulation of the visualized elements in the map field.

Figure 15:
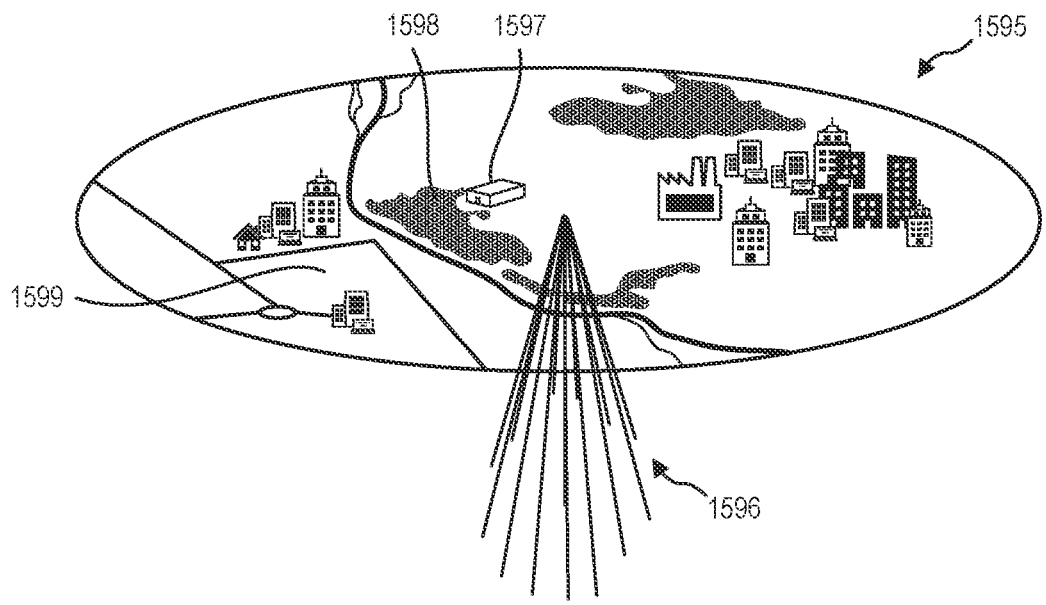
FIG. 15 is a user interface illustrating a visualization of a planned well in a geographic setting, according to some embodiments of the present disclosure.

FIG. 15 is an embodiment of a user interface illustrating a visualization 1595 of a planned well 1596, such as a geothermal well planned according to the present disclosure, in a geographic setting. In some embodiments, the visualization 1595 allow users to view a planned well and assessing the planned well for compliance purposes and other requirements. In some embodiments, visualization allows viewing and assessment of drilling physical and regulatory constraints. In some embodiments, the visualization 1595 includes at least one surface object and at least one subsurface object. For example, the at least one subsurface object may include a planned well 1596 according to any of the embodiments described herein. In some examples, the at least one subsurface object includes a known wellbore. In some examples, the at least one subsurface object includes a building foundation. In some examples, the at least one subsurface object includes underground infrastructure, such as road tunnels or rail systems.

In some embodiments, a surface object and/or a subsurface object is obtained from an open data sources, such as a public land register or recorder's database. In some embodiments, systems and methods according to the present disclosure receive and partition the publicly available data to be saved locally or remotely independently of the publicly available source. For example, as described in relation to FIG. 13, the publicly available data may be received, modified by automated process or by user input, and stored locally or remotely for future access.

In some embodiments, objects to be rendered in the visualization 1595 are spatially located relative to one another. In some embodiments, objects to be rendered in the visualization 1595 are spatially located relative to a reference frame. For example, a geographical position may be stored as a shape described in EPSG:4326 (latitude/longitude), such as used by global positioning satellites (GPS). In other examples, other coordinate systems and/or reference frames may be used, such as EPSG:3857 or EPSG:7789. In some embodiments, a system and/or method according to the present disclosure converts the location information and at least one other piece of information of the object to a 3-dimensional representation of the object.

In at least one embodiment, the chosen cartesian reference system is centered on the planned well 1596 as illustrated in FIG. 15. The reference system may use any unit system, such as the International System of Units (i.e., metric), British Imperial, United States Customary Units, etc. In at least one example, the projection from the WSG84 is made through the following equation, which assimilate the earth to a sphere. Given LngA, LatA (the EPSG:4326 coordinates of the center of the view in a cartesian reference system origin), LngB, LatB (the EPSG:4326 coordinates of the point to project), and given R_EARTH (the earth radius in meters, 6378137 m): the X, Y coordinates of the point in the cartesian reference system of the view are given by:

$$X = (lngB\text{-}lngA) * \text{R\_EARTH}/(180/PI) * \cos(latA * PI/180)$$

$$Y = (latB\text{-}latA) * (\text{R\_EARTH}/(180/PI))$$

In some embodiments, the above projection is more suitable to visualizing a planned well 1596 than other projections (like the projections UTM, Web Mercator, Lambert 93, etc.). In some embodiments, the above projection is very accurate at a scale appropriate for well planning, and the above projection is useable uniformly anywhere on earth. The former formula is used to convert the geospatial footprint of an object into its footprint within the view referential. In some cases, additional steps are required.

Some open data sources approximate the location of an object as a line as a simplification. For example, some open data source approximate roads, rails, and hydrographic sections as a line with no determined width in the geospatial information. In such instances, the line may be converted to a polygon by using a width or other dimension transverse to the line, if such dimension or property is available. In some embodiments, the width is approximated by a default value, such as for standardized or regulated infrastructure, including 2-lane roads, multi-lane highways, railways, etc.

In some embodiments, obtained data includes conflicts, such as between data sources or between object from a single data source. For example, a building, road section, or hydrographic section can be located within, or overlap, with a vegetation area. In some embodiments, artificial structures (e.g., buildings 1597, roadways, canals, railways, other human constructions, etc.) are given priority over natural structures or spaces (forests 1598, fields, streams, etc.) as the surveying of human constructions and updating of registers of human constructions are more precise and more frequent than the surveying and recording of natural structures or spaces. Additionally, the edge of a forest 1598 may move without a commensurate change in a publicly available data source, while buildings 1597, roadways, canals, railways, other human constructions are infrequently constructed (or removed) without legal recordation. Giving priority to a first object over a second object, in some embodiments, includes overwriting the location of the second object with the first object.

In some embodiments, object footprints can be enough to represent them when the object footprint is assimilated to a geographic surface, like roads. In some embodiments, the object footprint is representative of a 3-dimensional structure (either above the surface or subsurface). For example, the object footprint may be representative of a structure having a volume. In the case of a building, the volume of the building 1597 is approximated as a box having a bottom and a top of the shape of the footprint and a height, which is the height of the building 1597. While details regarding the roofline or other aspects of the construction may not be reflected by the approximation, the visualization will represent a volume that is the maximum dimension of the building.

In the case of the vegetation area such as the forest 1598, the volume may be procedurally generated. In some embodiments, the footprint of the forest 1598 is populated with evenly- and/or uniformly-spaced positions. The positions are subsequently each populated with a model of a tree. In some embodiments, the forest 1598 is therefore, represented by a plurality of tree models.

In some embodiments, the ground 1599 is regarded as being flat for the purposes of the small-scale projection described above. In some embodiments, the ground elevation is reflected in the visualization by obtaining elevation data from an available Digital Elevation Model (DEM). In some embodiments, the visualization approximates the ground as a 3-dimensional surface which will be generated as a triangular irregular network (TIN) generated from the DEM data points. In some embodiments, the objects positioned on the TIN include information about their elevation. In some embodiments, this information is more accurate than the data coming from the DEM, and this information is written into the grid, which removes at least some of the DEM data points. For example, overwriting the DEM data points with elevation data from individual objects may correct an inaccuracy coming from the DEM by using the known data points coming from some other sources. In some embodiments, the elevation data from individual objects may allow for higher-resolution elevation information, smoothing the 3-dimensional surface proximate to the objects. In some embodiments, artificially populated regions of the surface may add nodes to the TIN, allowing higher resolution (e.g., higher density) elevation changes. For example, regarding a vegetation area, at least some of the tree locations may be assigned an elevation value identified by interpolating the augmented DEM produced in the previous step. This may increase the density of elevation data point, making the vegetation area volume (collection of trees) follow the ground elevation variation more smoothly.

The present disclosure relates to systems and methods for planning and/or producing a geothermal well according to any of the following:

[A1] In some embodiments, a method of producing a geothermal well includes obtaining site information including at least a site volume; obtaining drilling parameters; determining orientations of the planned wellbores based at least partially on the site information, the drilling parameters, and the quantity of wellbores to position wellbores within boundaries of the site volume; and determining lengths of the planned wellbores based at least partially on the site information, the drilling parameters, and the quantity of wellbores to position wellbores within boundaries of the site volume.

[A2] In some embodiments, the site information of [A1] includes a geothermal profile.

[A3] In some embodiments, the site volume of [A1] or [A2] includes a no-drill zone.

[A4] In some embodiments, the no-drill zone of [A3] includes at least one building foundation.

[A5] In some embodiments, the site volume of any of [A1] through [A4] includes property limits and a maximum depth.

[A6] In some embodiments, the drilling parameters of any of [A1] through [A5] include wellbore properties.

[A7] In some embodiments, the drilling parameters of any of [A1] through [A6] include a cost-per-foot of a planned wellbore.

[A8] In some embodiments, the drilling parameters of any of [A1] through [A7] include a wellbore start cost of a planned wellbore.

[A9] In some embodiments, determining orientations and determining lengths of any of [A1] through [A8] includes calculating a thermal recovery score for each planned wellbore based at least partially on a location relationship of the planned wellbores relative to one another.

[A10] In some embodiments, calculating a thermal recovery score of [A9] for each planned wellbore is based at least partially on a drilling cost of each planned wellbore.

[A11] In some embodiments, calculating a thermal recovery score of [A9] for each planned wellbore is based at least partially on a thermal transfer rate of a formation in the site volume.

[A12] In some embodiments, the method of any of [A1] through [A11] includes determining a shared wellhead location based at least partially on the site volume.

[A13] In some embodiments, each planned wellbore of any of [A1] through [A12] originates from a single wellhead.

[A14] In some embodiments, the method of any of [A1] through [A13] includes calculating a first thermal recovery score for each planned wellbore based at least partially on a location relationship of the planned wellbores relative to one another; changing the quantity of planned wellbores to a second quantity of planned wellbores; determining orientations of a second array of planned wellbores based at least partially on the site information, the drilling parameters, and a second quantity of wellbores; calculating a second thermal recovery score for each planned wellbore of the second array based at least partially on a location relationship of the planned wellbores relative to one another; and comparing of the first thermal recovery score to the second thermal recovery score; wherein drilling at least a first wellbore of the planned wellbores based on a determined orientation and a determined length from the shared wellhead associated with a better thermal recovery score.

[A15] In some embodiments, the method of any of [A1] through [A14] includes calculating a value of a model for a plurality of well configurations, wherein each configuration of the plurality is distinct from the others, and wherein each well configuration includes wellbores with predetermined wellbore parameters.

[A16] In some embodiments, the wellbore parameters of [A15] include at least wellhead position, wellbore orientation, and wellbore length.

[A17] In some embodiments, the model of [A15] includes system constraints.

[A18] In some embodiments, the model of [A15] includes system inputs.

[A19] In some embodiments, the model of [A15] is a machine-learning model.

[A20] In some embodiments, the model of [A15] is an optimization model.

[A21] In some embodiments, the model of [A20] is configured to find a local maximum for a thermal recovery score.

[A22] In some embodiments, the model of [A20] is configured to optimize for cost.

[A23] In some embodiments, the model of [A15] includes legal and illegal configurations, with a penalty associated with illegal configurations.

[A24] In some embodiments, the model of any of claims [A1] to [A 23] is a function providing the value for a configuration based on the wellbore parameters of said configuration.

[A25] In some embodiment, the model of any of claims [A1] to [A 24] is a function derived of a g-function, which represents the thermal resistance between the borehole and the ground.

[A26] In some embodiments, the method of any of [A1] through [A25] further includes determining a quantity of planned wellbores having a shared wellhead based at least partially on the site information and drilling parameters.

[A27] In some embodiments, the method of any of [A1] through [A26] includes drilling at least a first wellbore of the planned wellbores based on a determined orientation and a determined length from the shared wellhead.

[B1] In some embodiments, a method of producing a geothermal well includes obtaining site information including at least a site volume; obtaining drilling parameters; determining a quantity of planned wellbores having a shared wellhead based at least partially on the site information and drilling parameters; determining orientations of the planned wellbores based at least partially on the site information, the drilling parameters, and the quantity of wellbores to position wellbores within boundaries of the site volume; determining lengths of the planned wellbores based at least partially on the site information, the drilling parameters, and the quantity of wellbores to position wellbores within boundaries of the site volume; drilling a first drilled wellbore of the planned wellbores based on a determined orientation and a determined length from the shared wellhead; measuring at least one wellbore property of the first drilled wellbore; recalculating orientations and lengths of remaining planned wellbores based at least partially on the at least one wellbore property of the first drilled wellbore; and drilling at least one drilled remaining wellbore of the remaining planned wellbores.

[B2] In some embodiments, the method of [B1] further includes comparing a measured value of the at least one wellbore property to a predetermined threshold value, and wherein the orientations and lengths of remaining planned wellbores are recalculated in response to the at least one wellbore property exceeding a threshold value or being outside of a range of threshold values.

[B3] In some embodiments, the method of [B1] or [B2] includes measuring at least one wellbore property of the at least one drilled remaining wellbore and recalculating orientations and lengths of remaining planned wellbores based at least partially on the at least one wellbore property of the at least one drilled remaining wellbore.

[B4] In some embodiments, the site information of any of [B1] through [B3] includes a geothermal profile of a formation of the site volume.

[B5] In some embodiments, the method of any of [B1] through [B4] further includes comparing a measured value of the at least one wellbore property to a predetermined threshold value and, in response to the measured value being within a threshold value or range of threshold values, drilling a second drilled wellbore of the planned wellbore.

[C1] In some embodiments, a method of producing a geothermal well includes obtaining site information including at least a site volume; obtaining drilling parameters; determining a quantity of planned wellbores having a shared wellhead based at least partially on the site information and drilling parameters; determining orientations of the planned wellbores based at least partially on the site information, the drilling parameters, and the quantity of wellbores to position wellbores within boundaries of the site volume; determining lengths of the planned wellbores based at least partially on the site information, the drilling parameters, and the quantity of wellbores to position wellbores within boundaries of the site volume; drilling a first drilled wellbore of the planned wellbores based on a determined orientation and a determined length from the shared wellhead; measuring at least one wellbore property of the first drilled wellbore; recalculating orientations and lengths of remaining planned wellbores based at least partially on the at least one wellbore property of the first drilled wellbore; and drilling an additional wellbore based at least partially on a measured wellbore property of a previously drilled wellbore.

[D1] In some embodiments, any of the methods of [A1] through [C1] includes obtaining land information and building information; applying a property (vertical and/or horizontal) buffer zone to outer property limit coordinates of the land information to create well property limit coordinates; applying a building (vertical and/or horizontal) buffer zone to outer building limit coordinates of the building information to create well building limit coordinates; and determining the site volume based at least partially on the well property limit coordinates and the well building limit coordinates.

[D2] In some embodiment, the method of [D1] further includes obtaining information about one or more elements of concern, such as water or vegetation zones, urban cables or pipe network. It may also apply a (vertical and/or horizontal) buffer zone to the boundaries of the element of concern to create element of concern limit coordinates; and determining the site volume based at least partially on the element of concern limit coordinates.

[D3] In some embodiments, obtaining land information and/or building information and/or element of concern information of [D1] or [D2] includes access a public register.

[D4] In some embodiments, the method of [D1], [D2] or [D3] further includes modifying the land information.

[D5] In some embodiments, the method of [D4] where modifying the land information includes combining a first plot of land and a second plot of land based at least partially the building information.

[D6] In some embodiments, the method of any of [D1] to [D5] further includes modifying the building information and/or the element of concern information.

[D7] In some embodiments, storing at least one modification of the land information or the building information of [D6] to a hardware storage device.

[D8] In some embodiments, the method of any of [D1] to [D7] further includes visualizing the planned wellbore in a subsurface portion of a three-dimensional rendering of the land information and the building information, and optionally the element of concern information.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A method of producing a geothermal well, the method comprising:
   obtaining site information including at least a site volume;
   obtaining drilling parameters;
   determining orientations and lengths of planned wellbores of the geothermal well based at least partially on the site information, the drilling parameters, and a model based at least partially on thermal efficiency of the planned wellbores, wherein the determining of the orientations and the lengths of the planned wellbores includes calculating thermal recovery scores of the model for a plurality of different well configurations, wherein each well configuration of the plurality of different well configurations includes wellbores with predetermined wellhead positions, wellbore orientations, and wellbore lengths, and wherein, for each well configuration of the plurality of different well configurations, the calculated thermal recovery score is indicative of efficiency of recovery of thermal energy via the wellbores.

2. The method of claim 1, wherein the site information further includes at least one of a geothermal profile, property limits, a maximum depth, or a no-drill zone.

3. The method of claim 1, wherein the site volume is calculated based at least partially on the site information.

4. The method of claim 1, wherein the drilling parameters include at least one of a wellbore property, a cost-per-foot of a planned wellbore, a wellbore start cost of a planned wellbore, or a total drilled length.

5. The method of claim 1, further comprising selecting an optimum configuration, wherein the thermal recovery score of the model corresponding to the optimum configuration is a local extremum of the model.

6. The method of claim 1, further comprising iteratively creating new well configurations by varying a parameter of one wellbore based on the configuration that has an optimum thermal recovery score for the model.

7. The method of claim 1, wherein each well configuration of the plurality of different well configurations is contained in the site volume and has a value of at least one drilling parameter that corresponds to a predetermined value.

8. The method of claim 1, wherein the model is based at least partially on at least one of total installation cost, drilling cost, or wellbore length.

9. The method of claim 1, further comprising determining a wellhead location for each planned wellbore of the planned wellbores based at least partially on the site information, the drilling parameters, and the model.

10. The method of claim 1, wherein each planned wellbore of the planned wellbores originates from a single wellhead.

11. The method of claim 1, further comprising determining a quantity of the planned wellbores based at least partially on the site information and drilling parameters.

12. The method of claim 11, wherein the geothermal well is a first geothermal well having a first quantity of the planned wellbores, the method further comprising:
calculating a first thermal recovery score for the first geothermal well based at least partially on a location relationship of the planned wellbores relative to one another;
changing a quantity of the planned wellbores to a second quantity of the planned wellbores;
determining orientations and lengths of the planned wellbores of a second geothermal well having the second quantity of the planned wellbores based at least partially on the site information, the drilling parameters, and a model based at least partially on thermal efficiency of the planned wellbores;
calculating a second thermal recovery score for the second geothermal well based at least partially on a location relationship of the planned wellbores relative to one another;
comparing the first thermal recovery score to the second thermal recovery score; and
selecting one of the first and second geothermal well based on the comparison.

13. The method of claim 1, further comprising drilling at least a first wellbore of the planned wellbores based on a determined orientation and a determined length.

14. The method of claim 13, further comprising:
drilling the first drilled wellbore of the planned wellbores based on the determined orientation and the determined length;
measuring at least one wellbore property of the first drilled wellbore;
recalculating orientations and lengths of remaining planned wellbores based at least partially on the at least one wellbore property of the first drilled wellbore; and
drilling at least one drilled remaining wellbore of the remaining planned wellbores.

15. The method according to claim 1, further comprising outputting the determined orientations and lengths of the planned wellbores of the geothermal well.

16. The method of claim 1, further comprising:
obtaining land information and building information;
applying a property buffer zone to outer property limit coordinates of the land information to create well property limit coordinates;
applying a building buffer zone to outer building limit coordinates of the building information to create well building limit coordinates; and
determining the site volume based at least partially on the well property limit coordinates and the well building limit coordinates.

17. The method of claim 1, further comprising visualizing the planned wellbore in a subsurface portion of a three-dimensional rendering of land information and building information.

18. A system producing a geothermal well, the system comprising one or more processing units configured for performing the method according to claim 1.

19. A non-transitory computer-readable storage medium including computer program instructions that, when executed by one or more processing units, cause the one or more processing units to perform the method according to claim 1.

* * * * *